US008372208B2

(12) United States Patent
Gauthier et al.

(10) Patent No.: US 8,372,208 B2
(45) Date of Patent: Feb. 12, 2013

(54) AUTOMATIC WASH BOOM ARM IMPACT SENSOR SYSTEM

(75) Inventors: David M. Gauthier, Denver, CO (US); Roderick MacWilliam, Arvada, CO (US)

(73) Assignee: Mark VII Equipment, Inc., Arvada, CO (US)

( * ) Notice: Subject to any disclaimer, the term of this patent is extended or adjusted under 35 U.S.C. 154(b) by 0 days.

(21) Appl. No.: 13/102,440

(22) Filed: May 6, 2011

(65) Prior Publication Data

US 2011/0276186 A1 Nov. 10, 2011

Related U.S. Application Data

(60) Provisional application No. 61/332,655, filed on May 7, 2010.

(51) Int. Cl.
*B08B 3/02* (2006.01)
(52) U.S. Cl. ........... 134/18; 134/32; 134/56 R; 134/123; 134/172
(58) Field of Classification Search .................... 134/18, 134/26, 34, 42, 56 R, 57 R, 123, 172; 15/53.1, 15/53.3; 239/751
See application file for complete search history.

(56) References Cited

U.S. PATENT DOCUMENTS

| | | | |
|---|---|---|---|
| 5,447,574 A | 9/1995 | Inoue | |
| 6,595,221 B2 * | 7/2003 | Jones et al. | 134/57 R |
| 6,863,739 B2 | 3/2005 | Fratello et al. | |
| 2009/0272409 A1 * | 11/2009 | Petit | 134/32 |

OTHER PUBLICATIONS

PCT Application No. PCT/US2011/035514, International Search Report and Written Opinion issued on Aug. 18, 2011, 15 pages.

* cited by examiner

*Primary Examiner* — Saeed T Chaudhry
(74) *Attorney, Agent, or Firm* — Dorsey & Whitney LLP

(57) ABSTRACT

In an automatic wash, a control unit operates a boom arm around a vehicle in a bay by moving a bridge along a lengthwise vehicle orientation, moving a trolley on the bridge along a widthwise vehicle orientation, and rotating the boom arm about the trolley. The boom arm is coupled to a mount which is flexibly coupled to the trolley such that boom arm impact displaces the mount and the trolley. The displacement may be two-dimensional and/or angular. In response, the control unit determines whether an impact has occurred by comparing the data to a baseline. If there is an impact, the control unit relocates the boom arm and may continue the wash process. If a sufficient force impact occurs that the control unit cannot correct, the boom arm may disengage from the mount which may trigger a breakaway sensor and cause the control unit to abandon the wash.

25 Claims, 38 Drawing Sheets

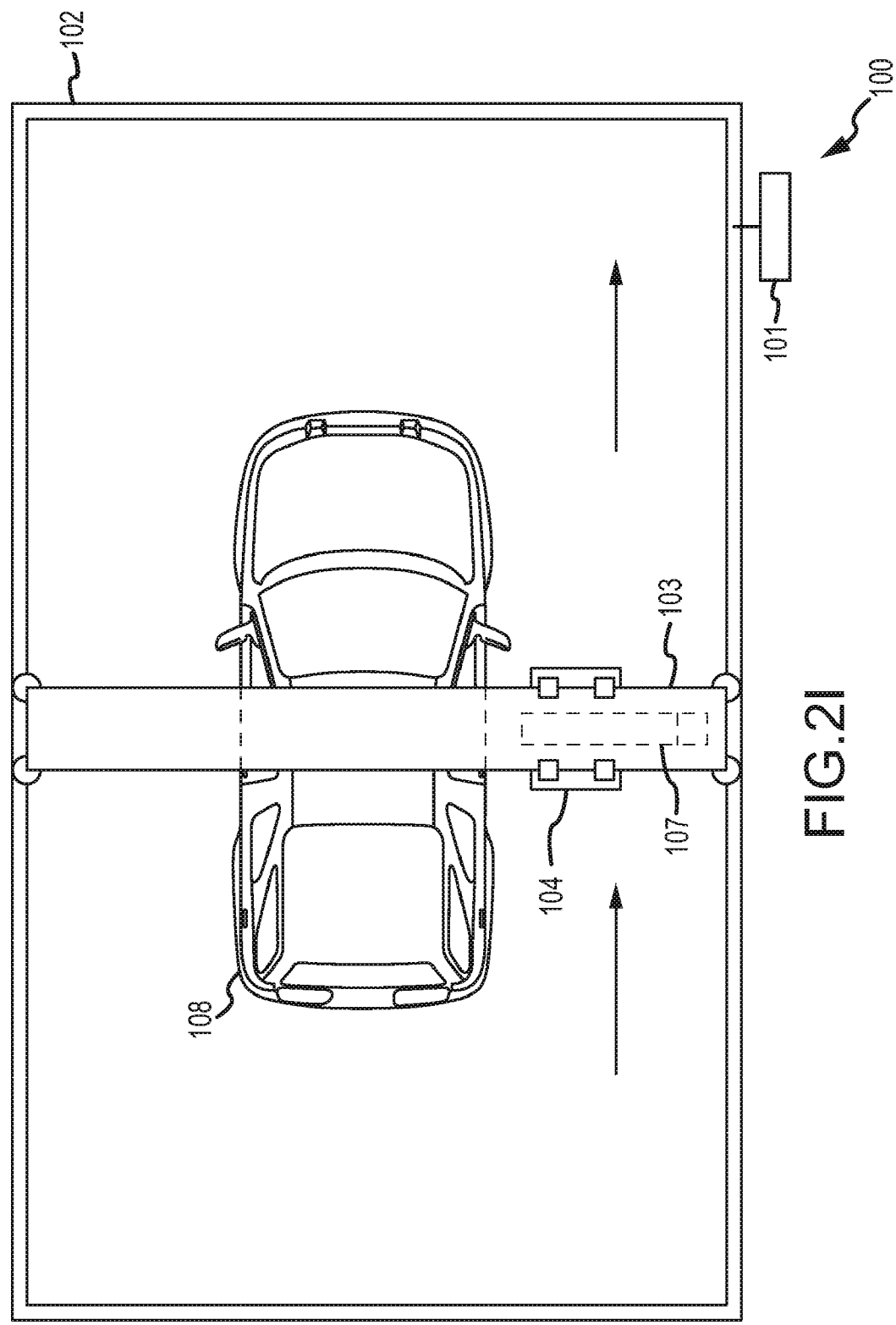

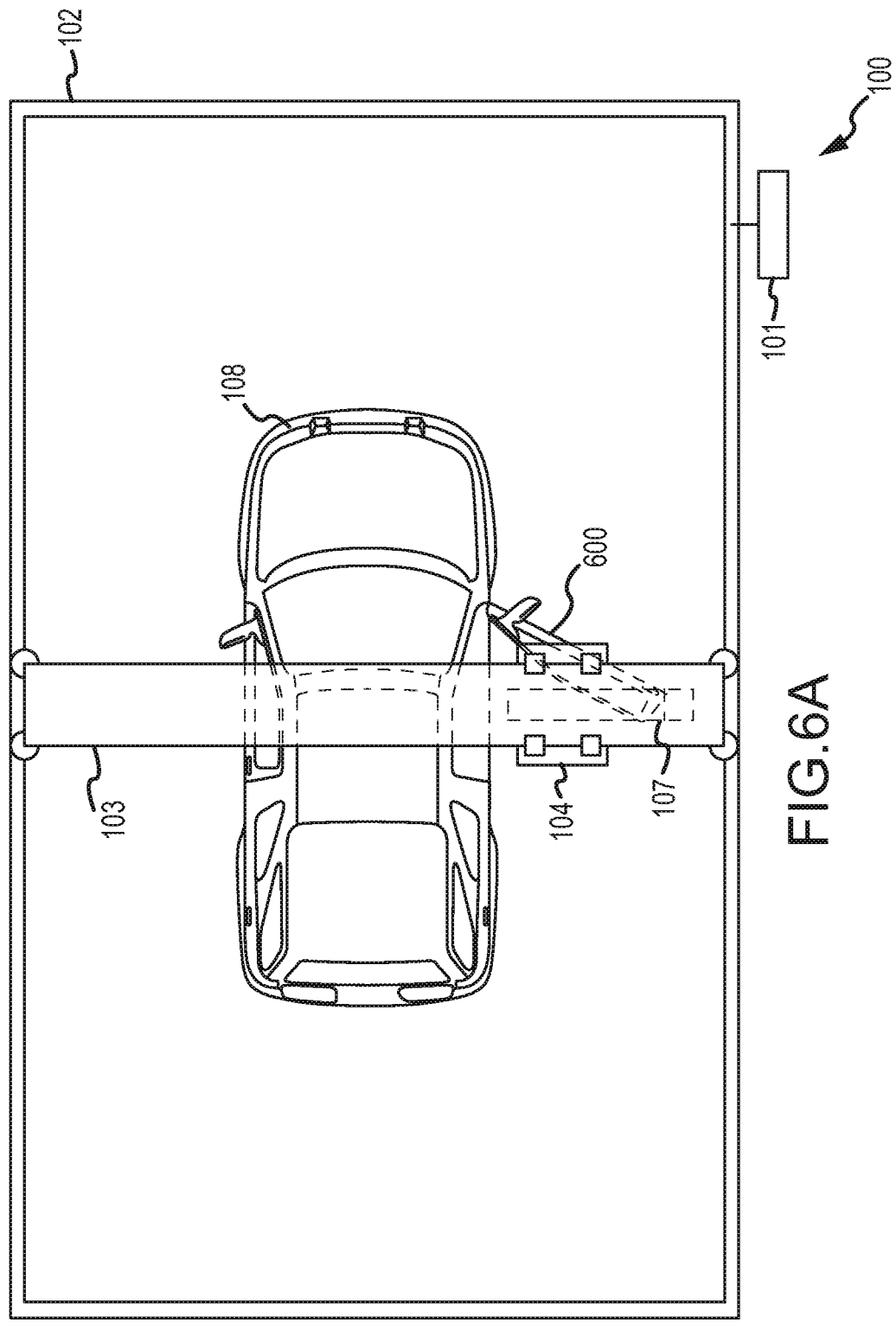

AUTOMATIC WASH BOOM ARM IMPACT SENSOR SYSTEM

CROSS REFERENCE TO RELATED APPLICATIONS

The application claims priority under 35 U.S.C. §119(e) to U.S. provisional application No. 61/332,655 entitled "Automatic wash boom arm impact sensor system" filed 7 May 2010, which is hereby incorporated herein by reference in its entirety.

TECHNICAL FIELD

The disclosed embodiments relate generally to automatic car wash systems, and more particularly to a boom arm impact sensor system for an automatic car wash.

BACKGROUND

The washing of automotive vehicles has been automated for some years with various types of apparatus. For example, there are overhead type vehicular wash systems wherein a vertical boom arm is manipulated (such as by the direction of a control unit) to travel around the perimeter of the vehicle and spray the vehicle while the vehicle remains stationary. In such systems, the vertical boom arm may be rotatably coupled to a trolley, which is in turn movably coupled to a bridge mounted to a track system above the vehicle. The bridge may be reciprocated back and forth along the length of the vehicle. The trolley may be reciprocated back and forth on a portion of the bridge along the width of the vehicle. The vertical boom arm may be circularly rotated around the trolley. Thus, via the movement of the bridge, the trolley, and the vertical boom arm, the vertical boom arm is manipulated to travel around the perimeter of the vehicle during the automatic wash process. As the vertical boom arm is manipulated around the perimeter of the vehicle, assumptions are generally made about the perimeter of the vehicle in order to prevent impact between the vertical boom arm and the vehicle during the automatic wash process. Different vehicles have different perimeters. Further, accessories such as trailer hitches, bike and ski racks, ramming plates, winches, and so on may alter the perimeter of the vehicle and may cause impact between the vertical boom arm and the vehicle, resulting in damage to the vehicular wash system and/or the vehicle.

Some gantry type car washes may utilize a series of shear pins that function to keep the vertical boom arm in the vertical position. In such washes, impact between the vertical boom arm and the vehicle fractures one or more of the shear pins and forces the vertical boom arm away from the vehicle, stopping the wash process. Service personnel may then be required to reset the vertical boom arm and install new shear pins. Other gantry type car washes may utilize a stabilizing plate held in place by bias force of an air cylinder. In such washes, impact between the vertical boom arm and the vehicle may rotate the vertical boom arm to exert force upon the stabilizing plate against the bias force of the air cylinder. In response, the wash process is typically ended so that the vertical boom arm may be reset by the bias force of the air cylinder against the stabilizing plate. However, in both of the above washes, the wash process ends upon the occurrence of an impact between the vertical boom arm and the vehicle.

The information included in this Background section of the specification, including any references cited herein and any description or discussion thereof, is included for technical reference purposes only and is not to be regarded subject matter by which the scope of the disclosure is to be bound.

SUMMARY

Systems and methods of the present disclosure provide handling of vertical boom arm impact in an automatic vehicle wash. During an automatic wash process, a control unit operates a vertical boom arm to travel around the perimeter of a vehicle in a wash bay. The control unit moves the vertical boom arm by moving a bridge that is operable to reciprocate along an orientation substantially parallel to the lengthwise orientation of the vehicle, moving a trolley on the bridge along an orientation substantially parallel to the widthwise orientation of the vehicle, and circularly rotating the vertical boom arm with respect to the trolley. The vertical boom arm is coupled to a boom arm mount. The boom arm mount is flexibly coupled to the trolley via a flexible attachment assembly such that an impact between the vertical boom arm and the vehicle causes a displacement between the boom arm mount and the trolley. One or more sensors detect the displacement and/or a rate of displacement between the boom arm mount and the trolley and transmit the detected displacement and/or rate of displacement to the control unit. In response to receiving data from the one or more sensors, the control unit determines whether an impact has occurred by comparing the data to a baseline. If an impact has occurred, the control unit relocates the vertical boom arm and may continue the wash process.

In one or more embodiments, the boom arm mount may include a first plate mounted utilizing one or more flexible attachment members (e.g., springs, rubber mounts, and so on) to a second plate that is fixedly attached to the trolley. The boom arm mount may also include a boom arm displacement member that projects through an aperture in the second plate. The second plate may include a trolley displacement member and a gap may be defined between the trolley displacement member and a portion of the boom arm displacement member. One or more proximity sensors may be positioned within the gap and may be operable to detect two-dimensional displacement and/or a rate of two-dimensional displacement between the first plate and second plate by detecting changes in proximity between the boom arm displacement member and the one or more sensors.

In one or more other embodiments, the boom arm mount may include a first plate rotatably mounted (e.g., as by a bearing assembly) to a second plate which is fixedly attached to the trolley. The first plate may be biased against rotation (e.g., via a spring-bias mechanism). When angular displacement of the first plate occurs with respect to the second plate, such as when an impact occurs between the vertical boom arm and a vehicle, the angular displacement may change the position of one or more proximity sensors with respect to one or more sensor plates. The one or more proximity sensors may detect angular displacement and/or a rate of angular displacement between the boom arm mount and the trolley by detecting changes in proximity between the one or more proximity sensors and the one or more sensor plates. The one or more proximity sensors may transmit data regarding the detected angular displacement and/or rate of angular displacement to the control unit.

The control unit may direct different operations to relocate the vertical boom arm differently based on the quadrant of the wash bay the vertical boom arm is located within. Relocation of the boom arm may constitute returning the vertical boom arm to the home position. After returning the vertical boom arm to the home position the control unit may continue the wash process utilizing one of more spray mechanisms other than the vertical boom arm. Alternatively, after returning the vertical boom arm to the home position the control unit may prematurely end the wash process. Relocation of the boom arm may also constitute operating the vertical boom arm to travel in a larger perimeter around the vehicle and the control unit may then continue the wash process utilizing the larger perimeter.

The control unit may utilize different baselines based on the quadrant of the wash bay boom arm is located within. The baseline may include an expected displacement and/or an expected rate of displacement between the trolley and the boom arm related to movement of the bridge, movement of the trolley, rotation of the boom arm, thrust of one or more spray nozzles included in the vertical boom arm, and so on. The baseline utilized by the control unit during the automatic wash process may be derived by recording data received from at least one sensor during a previously performed automatic wash process where an impact did not occur between the vertical boom arm and a vehicle in the wash bay.

In some implementations, the vertical boom arm may include a breakaway mechanism (such as a spring loaded ball detent) that is operable to disengage the vertical boom arm when an impact occurs between the vertical boom arm and a vehicle and/or another object that is a greater impact than the control unit has the ability to correct for. In such implementations, the vertical boom arm may include a breakaway target plate assembly and one or more breakaway sensors which detect when a breakaway has occurred by detecting vertical displacement of the breakaway target plate. If the control unit determines that the breakaway sensor has detected a breakaway, the control unit may abandon the current wash and remain dormant until the breakaway mechanism is reset and the automatic vehicle wash is reset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure is provided in the following written description of various embodiments of the disclosure, illustrated in the accompanying drawings, and defined in the appended claims.

BRIEF DESCRIPTION OF THE DRAWINGS

FIGS. 2A through 2I are top plan views of the automatic vehicle wash system of FIG. 1 illustrating performance of a wash process.

FIGS. 6A through 6D are top plan views of the automatic vehicle wash system of FIG. 1 illustrating a fourth kind of impact between a vertical boom arm and an obstruction during a wash process and continuance of the wash process after the impact.

DETAILED DESCRIPTION

Figure 1:
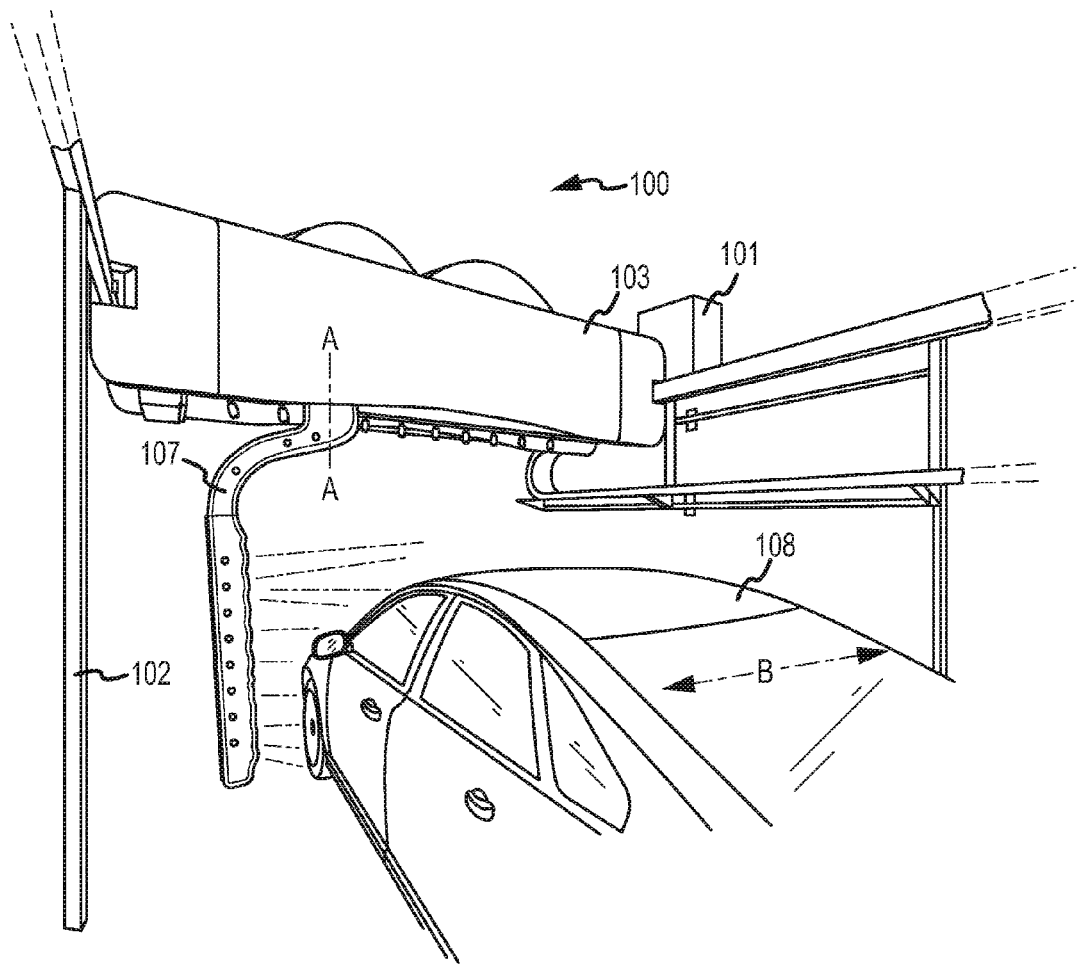
FIG. 1 is a front perspective view of an automatic vehicle wash system in accordance with the present disclosure.
Figure 2A:
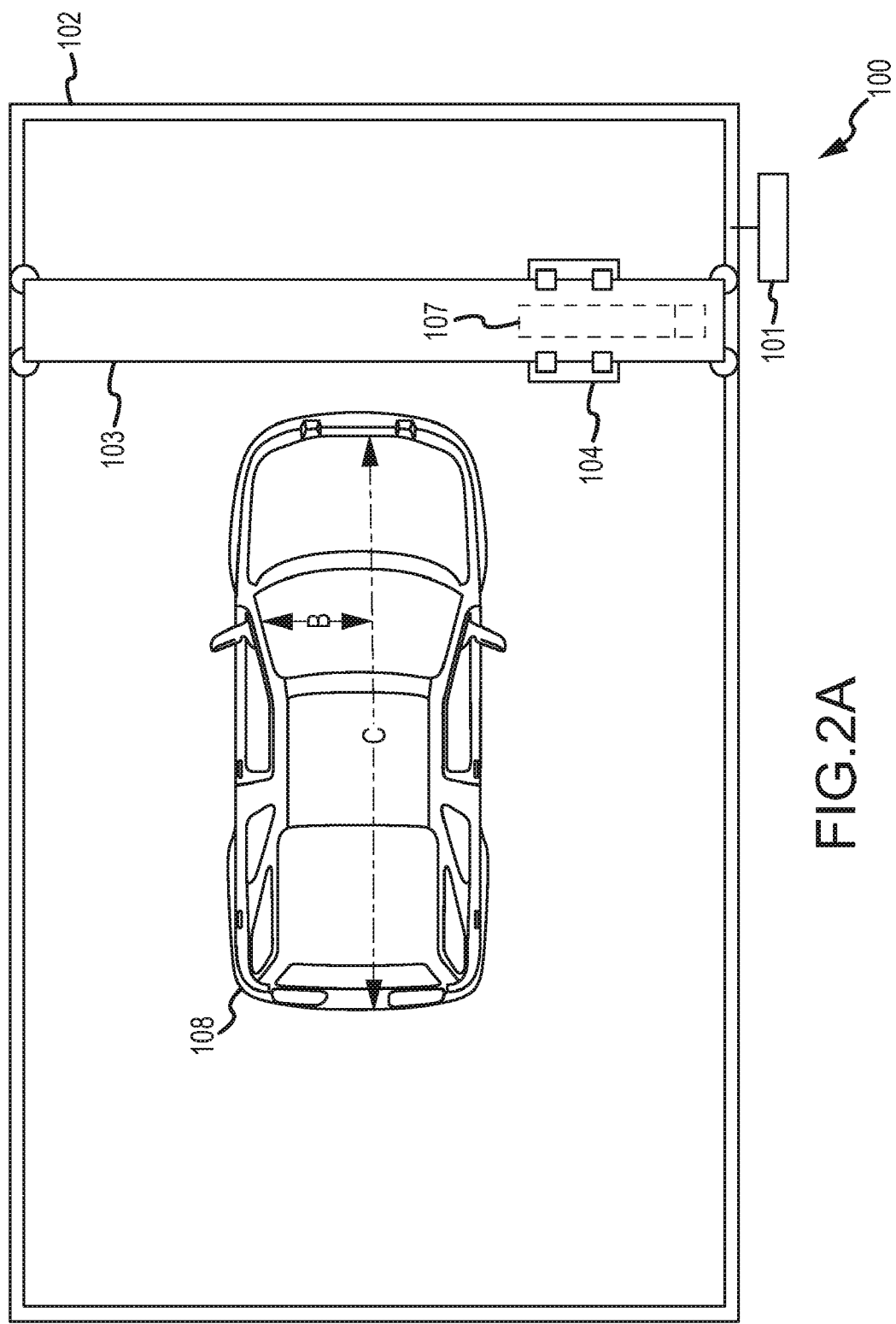

FIGS. 1 and 2A illustrate an automatic car wash system 100 in accordance with the present disclosure. As illustrated, the system 100 includes a frame 102 that is operable to define a wash bay around the perimeter of a vehicle 108. The frame 102 includes a bridge 103 that is operable by a control unit 101 to reciprocate (for example, by an assembly of one or more motors, wheels, tracks, and so on) on the frame 102 along a orientation C (shown in FIG. 2A) that is lengthwise with respect to the vehicle 108. The system 100 also includes a trolley 104 that is operable by a control unit 101 to reciprocate (for example, by an assembly of one or more motors, wheels, tracks, and so on) on the bridge 103 along a orientation B (shown in FIGS. 1 and 2A) that is widthwise with respect to the vehicle 108. Further, the system 100 includes a motor mount plate 105, flexibly coupled to the trolley 104, that is rotatably coupled to a vertical boom arm 107 via a vertical boom arm shaft 106. Utilizing a motor (not shown)

coupled to the motor mount plate 105 and the vertical boom arm shaft, the control unit 101 is operable to rotate the vertical boom arm 107 circularly around the trolley 104 on an axis A (shown in FIG. 1).

FIGS. 2A through 2I illustrate an exemplary wash process performed by the system 100 where an impact does not occur between the vertical boom arm 107 and the vehicle 108. During the wash process, the vertical boom arm 107 may be operable to spray the vehicle 108 with one or more pre-soak solutions, high pressure and/or low pressure rinses, wax solutions, pre-wax solutions, and so on. Further, the system 100 may include other spray mechanisms, for example, nozzles mounted on the bridge 102, in addition to the vertical boom arm 107, which may be operable to spray one or more pre-soak solutions, high pressure and/or low pressure rinses, wax solutions, pre-wax solutions, and so on.

Figure 2B:
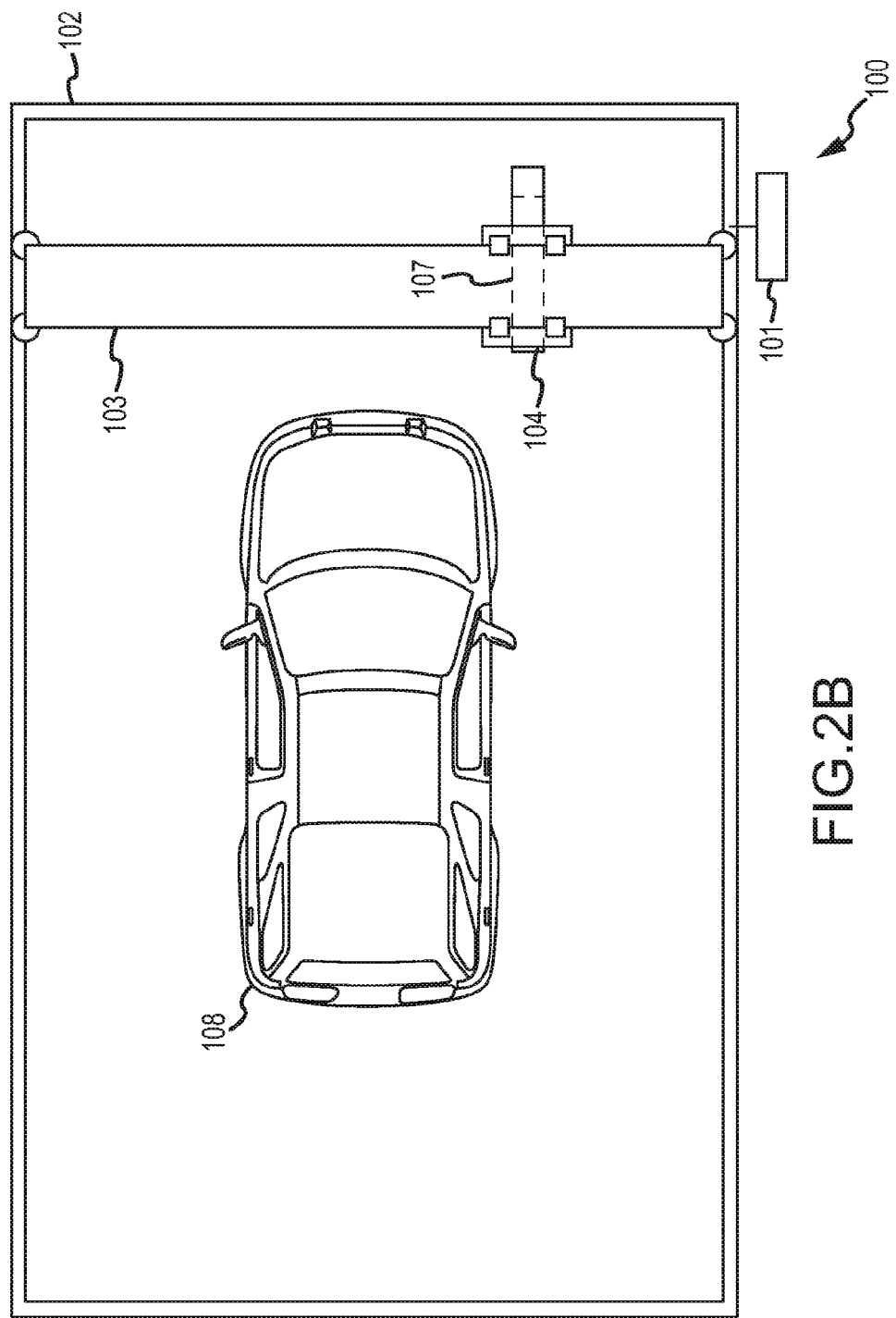
Figure 2C:
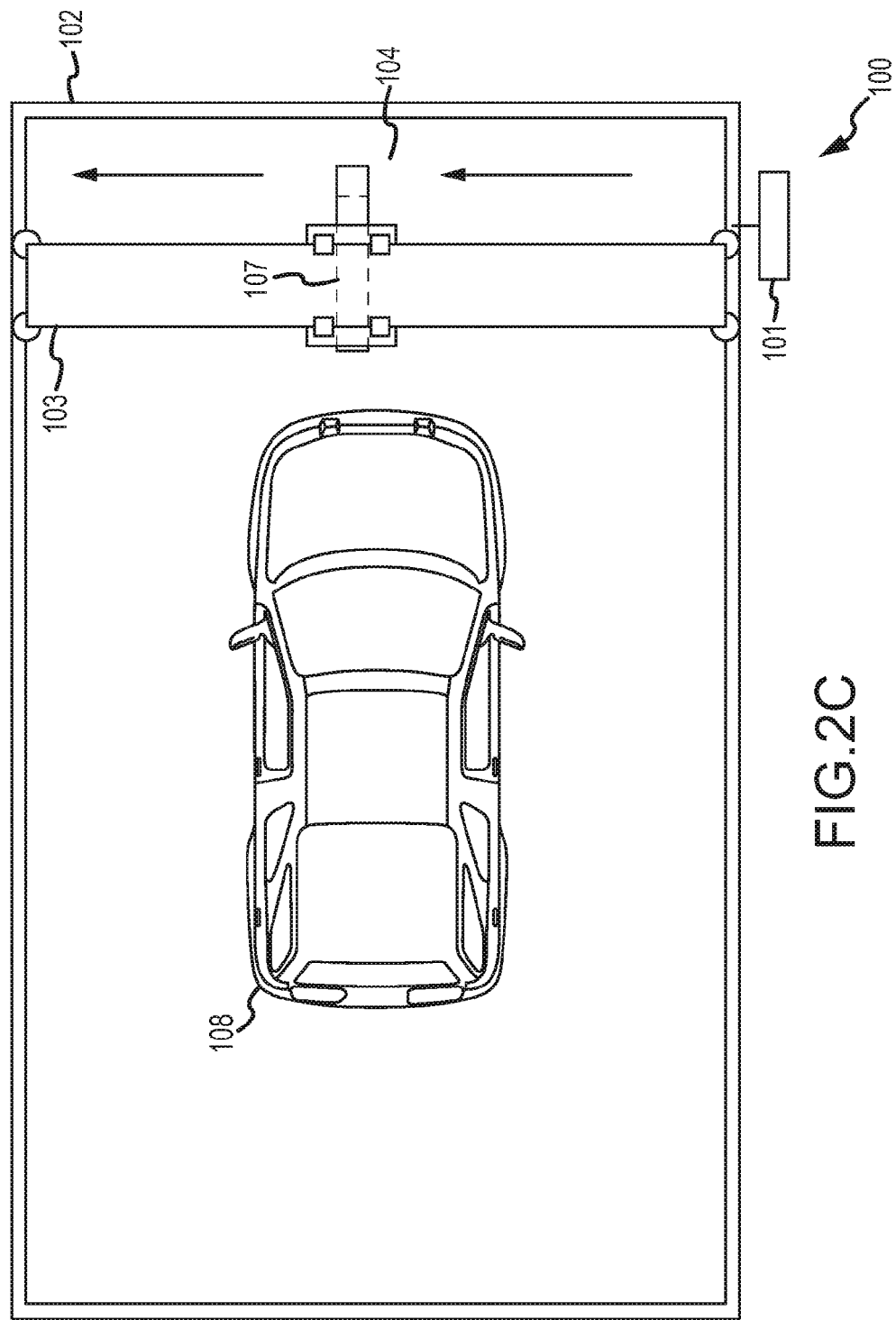

FIG. 2A illustrates the system 100 with the bridge 103, the trolley 104, and the vertical boom arm 107 located at a home position. The control unit 101 may be operable to locate the bridge 103, the trolley 104, and the vertical boom arm 107 in the home position when the wash process is not occurring. As illustrated, in the home position the vertical boom arm 107 is positioned parallel to the orientation B. At the commencement of the wash process, the control unit 101 may move rotate the vertical boom arm 107 such that it is parallel to the orientation C, as shown in FIG. 2B. The control unit 101 may then move the trolley 104 on the bridge 103 along the orientation B while spraying the vehicle 108 utilizing the vertical boom arm 107, as shown in FIG. 2C.

Figure 2D:
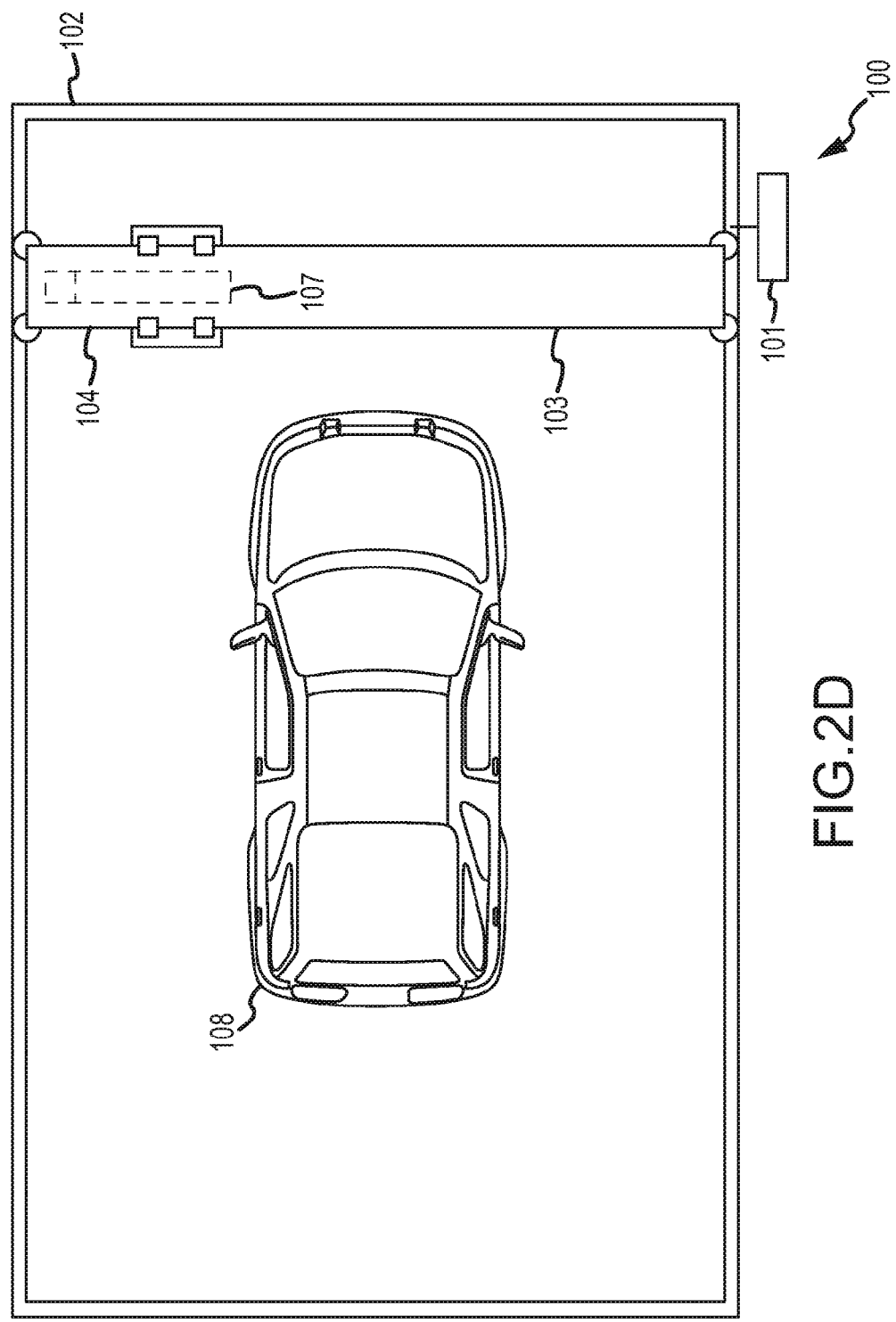
Figure 2E:
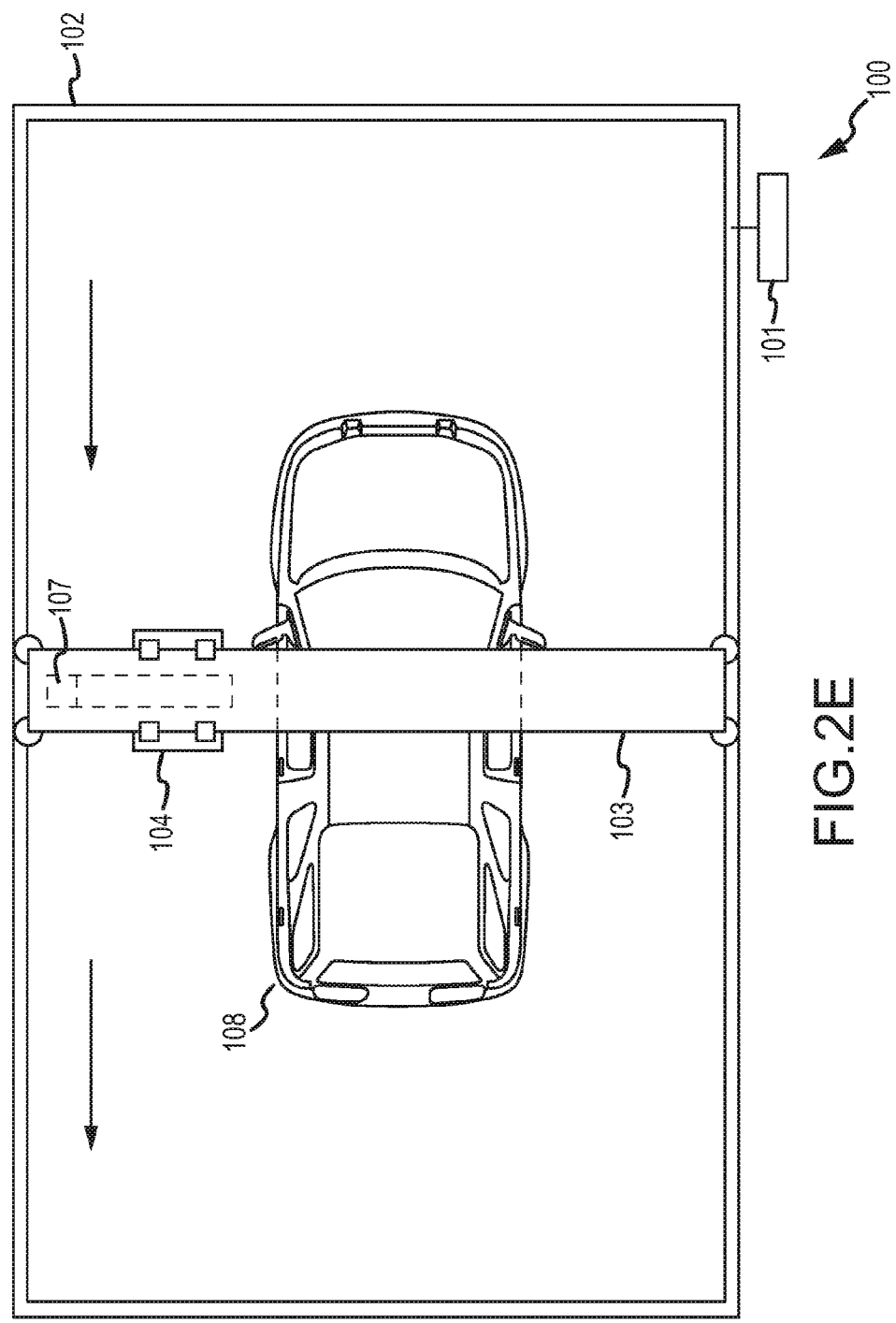

As shown in FIG. 2D, when the limit of the assumed front perimeter is reached (at an assumed driver side perimeter location of the vehicle 108), the control unit 101 may then cease movement of the trolley 104 and rotate the vertical boom arm 107 such that it is parallel to the orientation B. The control unit may then move the frame 102 along the orientation C while spraying the vehicle 108 utilizing the vertical boom arm 107, as shown in FIG. 2E.

Figure 2F:
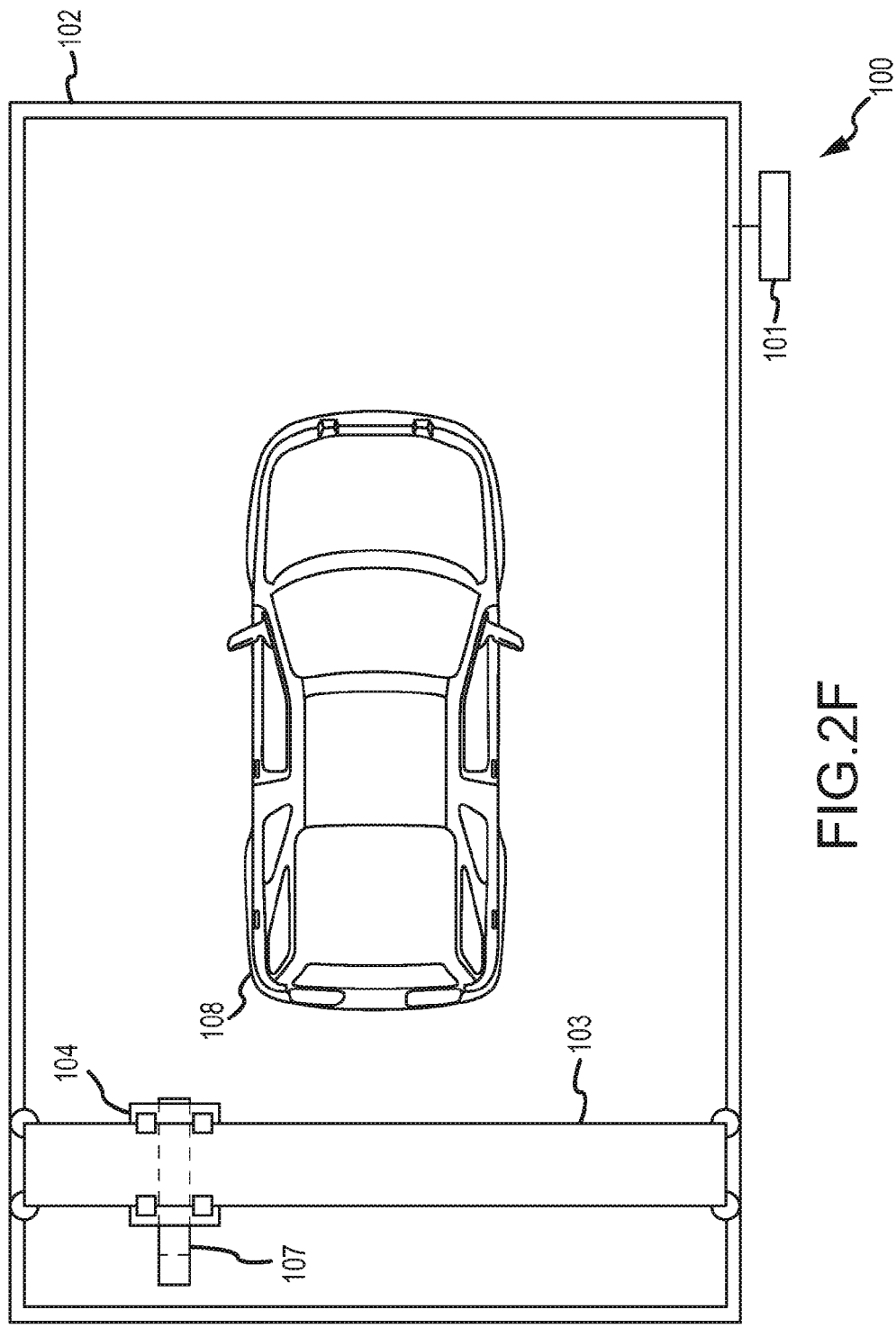
Figure 2G:
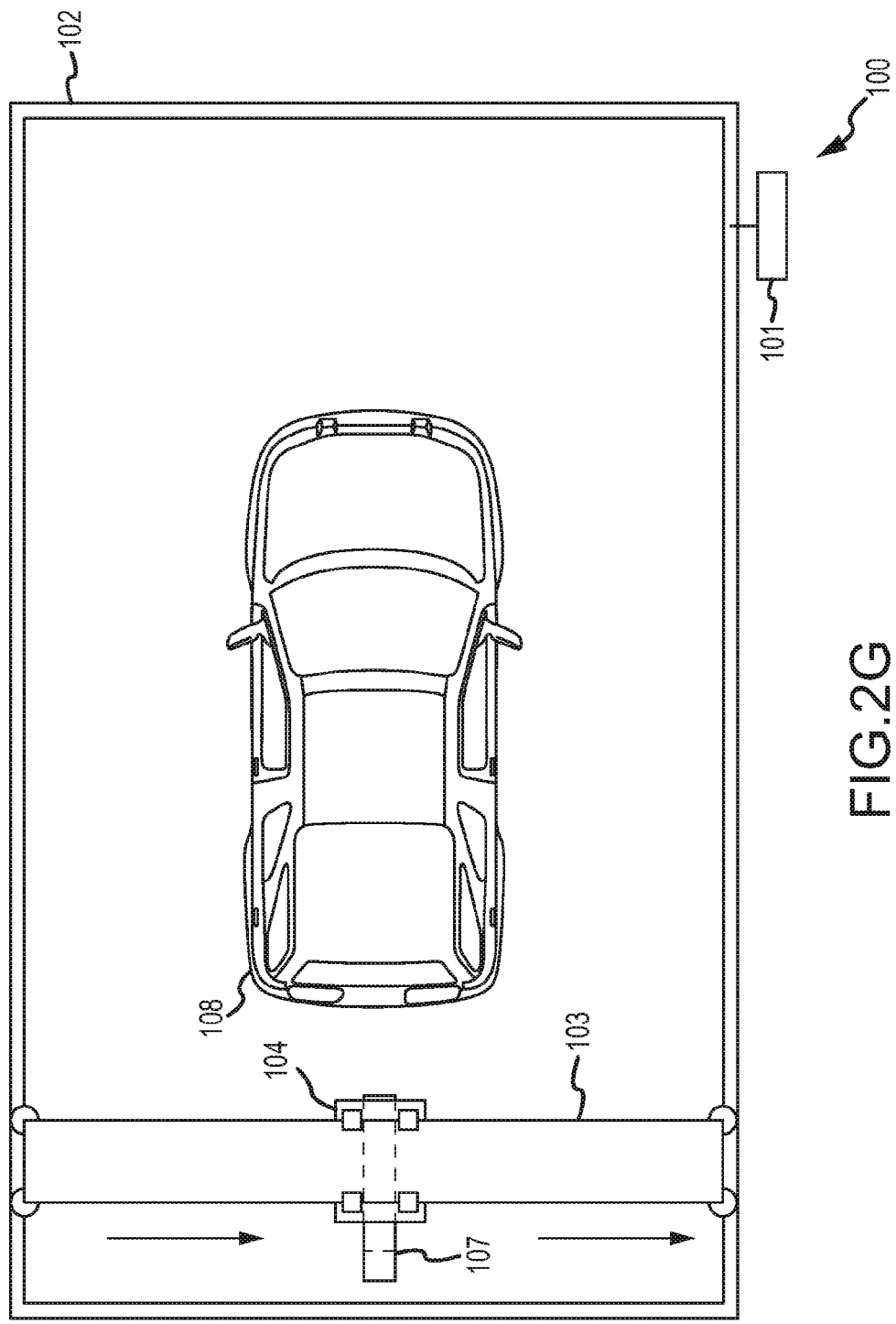

As shown in FIG. 2F, when the limit of the assumed driver side perimeter is reached (at an assumed back perimeter location of the vehicle 108), the control unit 101 may then cease movement of the bridge 103 and rotate the vertical boom arm 107 such that it is parallel to the orientation C. The control unit may then move the trolley 104 on the bridge 103 along the orientation B while spraying the vehicle 108 utilizing the vertical boom arm 107, as shown in FIG. 2G.

Figure 2H:
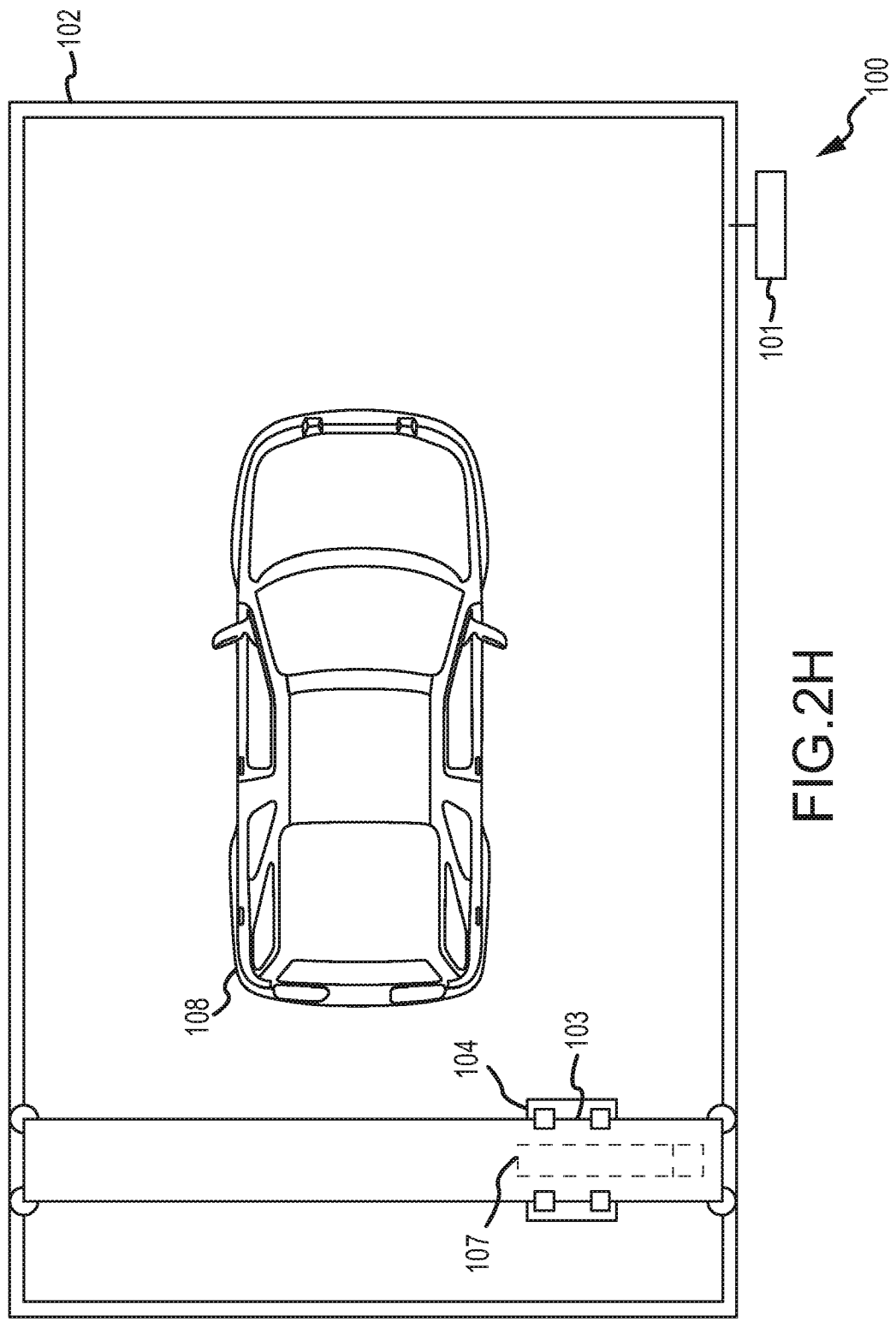

As shown in FIG. 2H, when the limit of the assumed back perimeter is reached (at an assumed passenger side perimeter location of the vehicle 108), the control unit 101 may then cease movement of the trolley 104 and rotate the vertical boom arm 107 such that it is parallel to the orientation B. The control unit may then move the frame 102 along the orientation C while spraying the vehicle 108 utilizing the vertical boom arm 107, as shown in FIG. 2I.

When the limit of the assumed passenger side perimeter is reached (at the assumed front perimeter location of the vehicle 108), the control unit 101 may then return the bridge 103, trolley 104, and vertical boom arm 107 to the home location, as shown in FIG. 2A. Although the above describes the vertical boom arm 107 traveling in a single complete counter-clockwise path around the assumed perimeter of the vehicle 108, other patterns are possible without departing from the scope of the present disclosure. For example, the vertical boom arm 107 may travel in a clockwise pattern, travel multiple times around the assumed perimeter of the vehicle, travel part of the way around the assumed perimeter of the vehicle 108 counter-clockwise and then reverse and travel the rest of the way around the assumed perimeter of the vehicle 108 clockwise, travel part of the way around the assumed perimeter of the vehicle 108 clockwise and then reverse and travel the rest of the way around the assumed perimeter of the vehicle 108 counter-clockwise, and so on.

Further, the control unit 101 may be operable to receive data from one or more sensors during the wash process indicating that an impact may have occurred between the vertical boom arm 107 and the vehicle 108. The motor mount plate 105 may be flexibly attached to the trolley 104, for example, by springs, rubber mounts, and so on. If an impact occurs during the wash process between the vertical boom arm 107 and the vehicle 108, the impact may transfer from the vertical boom arm 107 (via the vertical boom arm shaft 106) to the motor mount plate 105, resulting in a displacement between the trolley 104 and the motor mount plate 105. In some implementations, the displacement may be a two-dimensional (along x and y planes) displacement. In other implementations, the displacement may be an angular displacement. The one or more sensors may be operable to measure the resulting displacement and/or a displacement velocity between the motor mount plate 105 and the trolley 104 and transmit the measurements to the control unit 101.

Further, during the wash process, some displacement between the trolley 104 and the motor mount plate 105 may be caused by occurrences other than impact between the vertical boom arm 107 and the vehicle 108. For example, such displacement may be caused by the movement of the bridge 103, the movement of the trolley 104, the rotation of the vertical boom arm 107, the thrust of the spray from the vertical boom arm 107, and so on. To account for such non-impact related displacement, the control unit 101 may compare data received from the one or more sensors to a baseline. The control unit 101 may determine an impact occurred if the data meets and/or exceeds the baseline. Contrarily, the control unit 101 may determine an impact has not occurred if the data does not meet and/or exceed the baseline. The baseline may include information on displacement during the wash process attributable to the movement of the bridge 103, the movement of the trolley 104, the rotation of the vertical boom arm 107, the thrust of the spray from the vertical boom arm 107, and so on. In some implementations, the baseline may be created by measuring data from the one or more sensors during a wash process when an impact did not occur.

Moreover, the control unit 101 may compare the data received from the one or more sensors to different baselines depending on the quadrant of the wash bay (for example, the front of the vehicle 108, the drivers side of the vehicle 108, the back of the vehicle 108, and the passenger side of the vehicle 108) that the vertical boom arm 107 is located in. For example, the thrust of the spray from the vertical boom arm 107 may result in displacement in a different direction for each of the quadrants as the spray is in a different direction. The baseline utilized by the control unit 101 for each of the quadrants may reflect this difference, allowing the control unit 101 to weight displacement from the associated direction of the spray thrust less than displacement from other directions. By way of another example, an impact between the vertical boom arm 107 and the vehicle 108 may result in displacement in a different direction for each of the quadrants as the vertical boom arm 107 travels in a different direction. The baseline utilized by the control unit 101 for each of the quadrants may reflect this difference, allowing the control unit 101 to weight displacement from the associated direction of travel more than other directions.

If the control unit 101 determines that an impact has occurred during the wash process between the vertical boom arm 107 and the vehicle, the control unit 101 may relocate the vertical boom arm 107 (such as by moving the bridge 103, moving the trolley 104, rotating the vertical boom arm 107, and so on). In some implementations, the control unit 101 may relocate the vertical boom arm 107 and perform operations to continue the wash process after the relocation. The operations the control unit 101 may perform to continue the wash process may depend on the quadrant the vertical boom arm 107 was located in when the control unit 101 determined an impact occurred.

Figure 3:
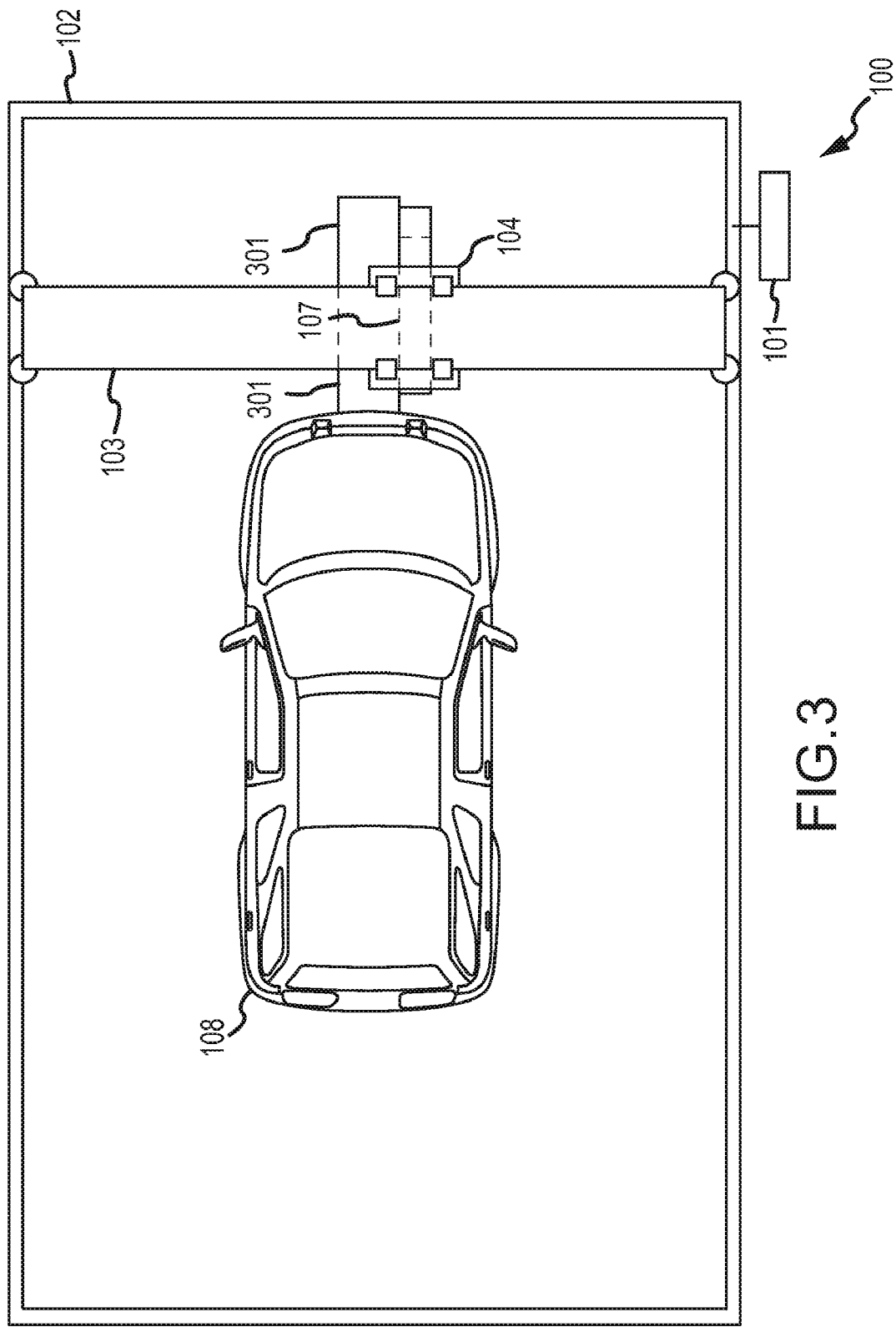
FIG. 3 is a top plan view of the automatic vehicle wash system of FIG. 1 illustrating a first kind of impact between a vertical boom arm and an obstruction during a wash process.

By way of a first example, FIG. 3 illustrates an impact between the vertical boom arm 107 and an obstruction on the front of the vehicle 108. The obstruction may be any kind of obstruction on the front of the vehicle such as a winch mounted on the front of the vehicle 108, a ramming plate mounted on the front of the vehicle 108, a bike and/or ski rack mounted on the front of the vehicle 108, an irregular bumper of the vehicle 108, a spare tire mounted on the front of the vehicle 108, and so on. Regardless of the type of obstruction, the actual front perimeter of the vehicle 108 exceeds the assumed front perimeter. As illustrated, in this example the obstruction is a winch 301 mounted on the front of the vehicle 108. When the control unit 101 determines that the impact illustrated in FIG. 3 has occurred, the control unit 101 may stop movement of the trolley 104 and may return the bridge 103, trolley 104, and vertical boom arm 107 to the home position shown in FIG. 2A. The control unit 101 may return the bridge 103, trolley 104, and vertical boom arm 107 to the home position as the system 100 may not be capable of moving the bridge 103, trolley 104, and vertical boom arm 107 sufficiently away from the front of the vehicle 108 to continue the wash process utilizing the vertical boom arm 107. In implementations where the system 100 is capable of moving the bridge 103, trolley 104, and vertical boom arm 107 sufficiently away from the front of the vehicle 108, the control unit 101 may move the bridge 103, trolley 104, and vertical boom arm 107 to a new assumed front perimeter and continue the wash process utilizing the vertical boom arm 107. In implementations where the In some implementations of this example, if the system 100 includes other spray mechanisms (for example, nozzles mounted on the bridge 103 and so on) in addition to the vertical boom arm 107, the control unit 101 may then continue the wash process utilizing the other spray mechanisms and/or perform a single rinse pass. In other implementations of this example, the control unit 101 may then terminate the wash process.

Figure 4A:
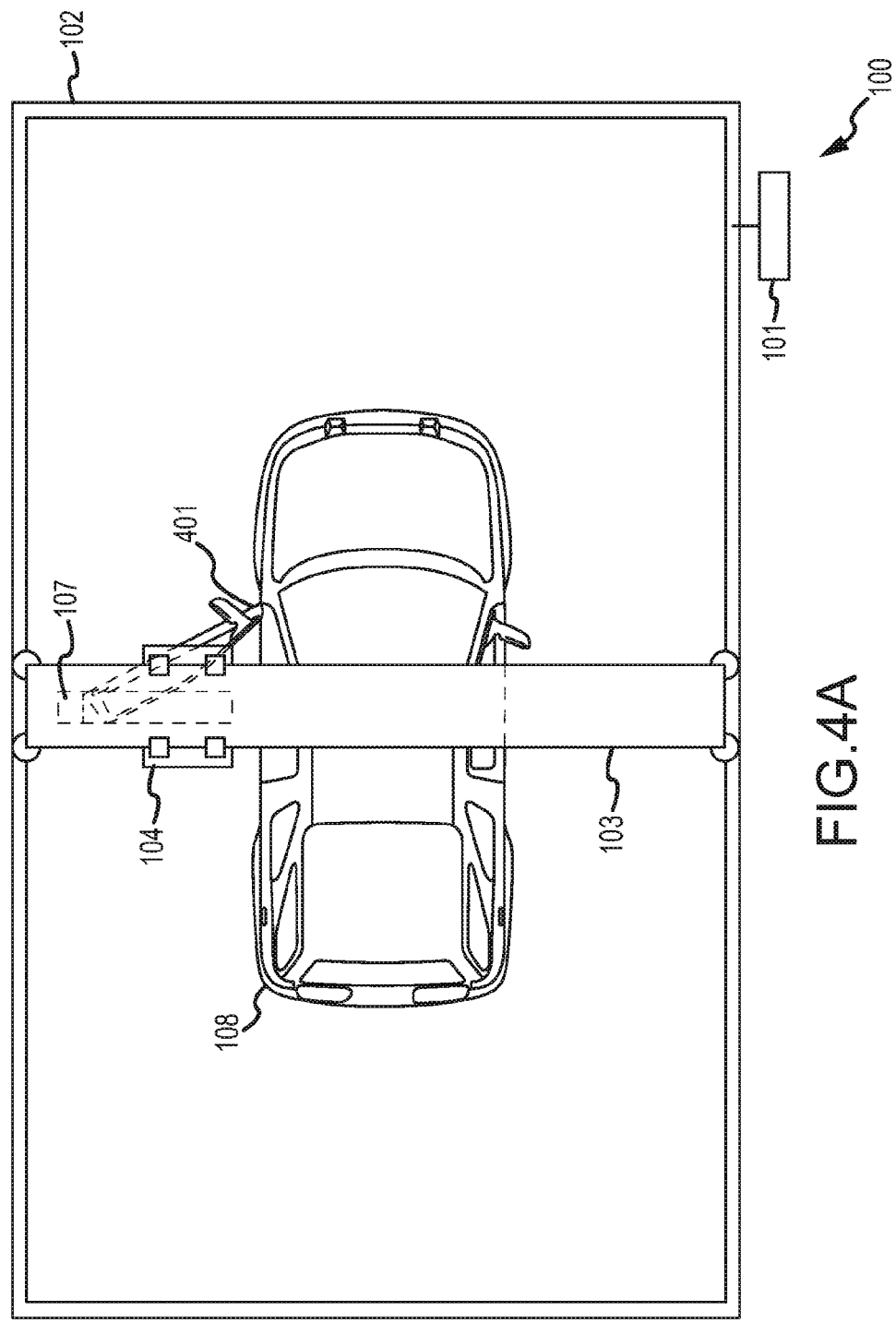
FIGS. 4A through 4D are top plan views of the automatic vehicle wash system of FIG. 1 illustrating a second kind of impact between a vertical boom arm and an obstruction during a wash process and continuance of the wash process after the impact.
Figure 4B:
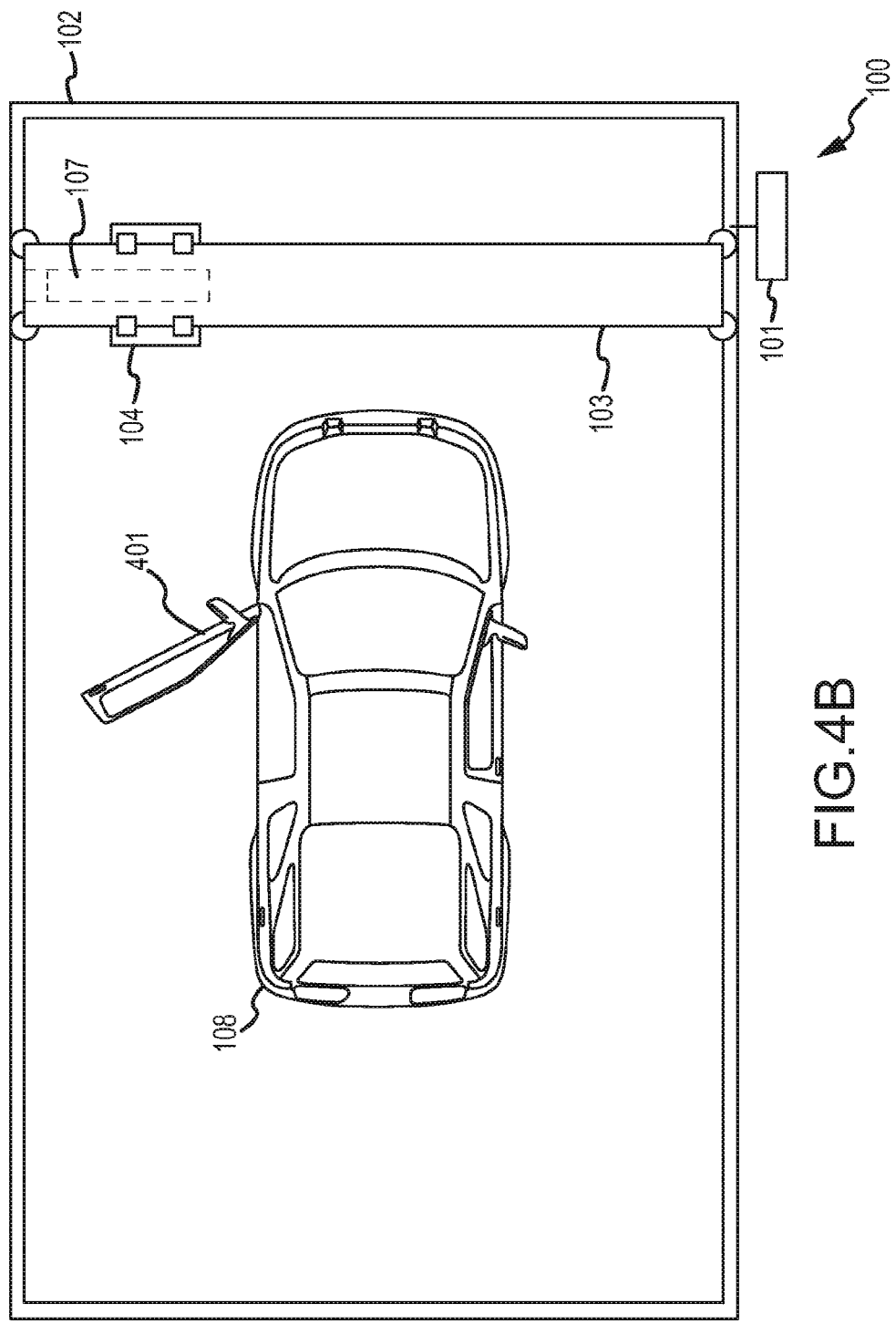
Figure 4C:
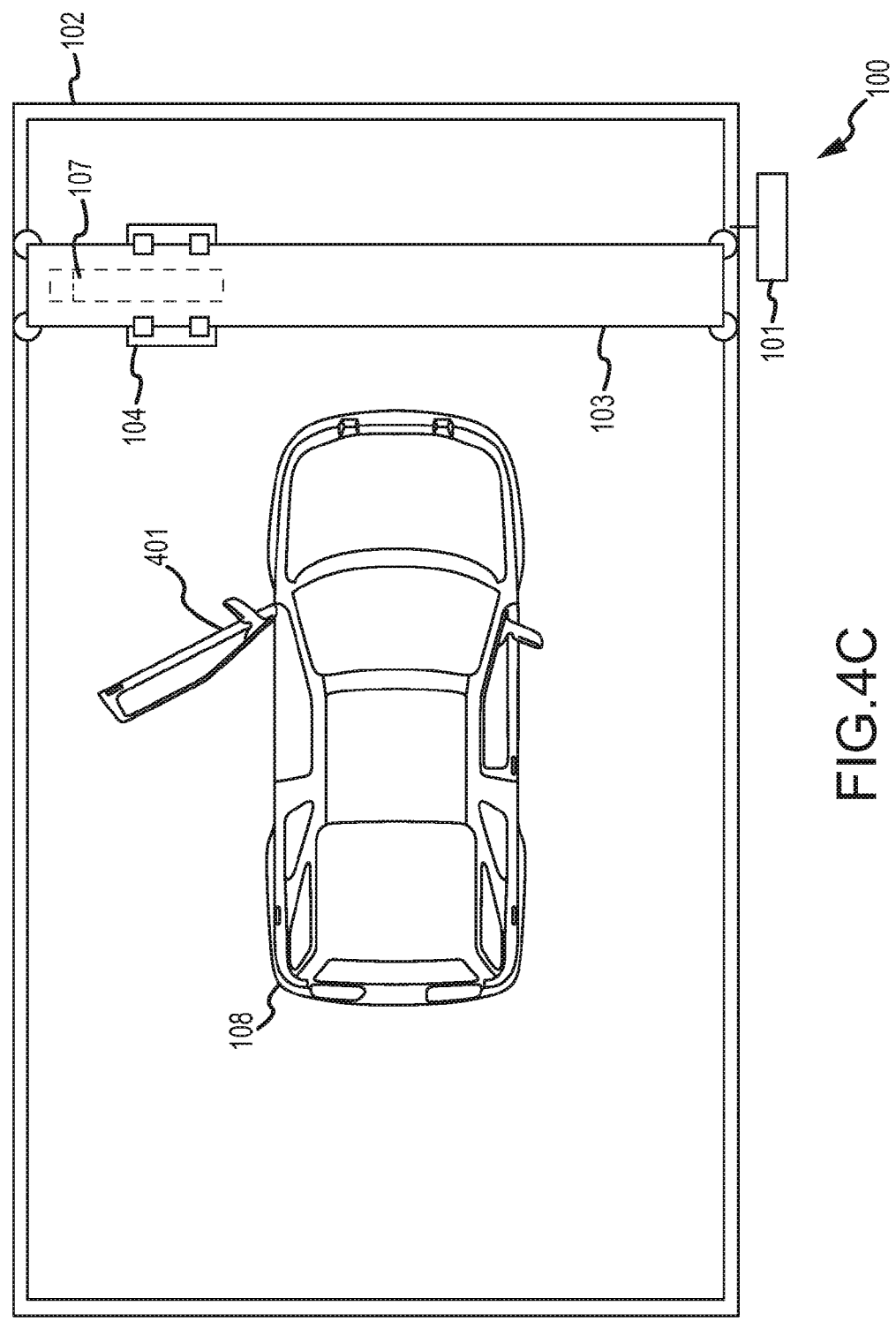
Figure 4D:
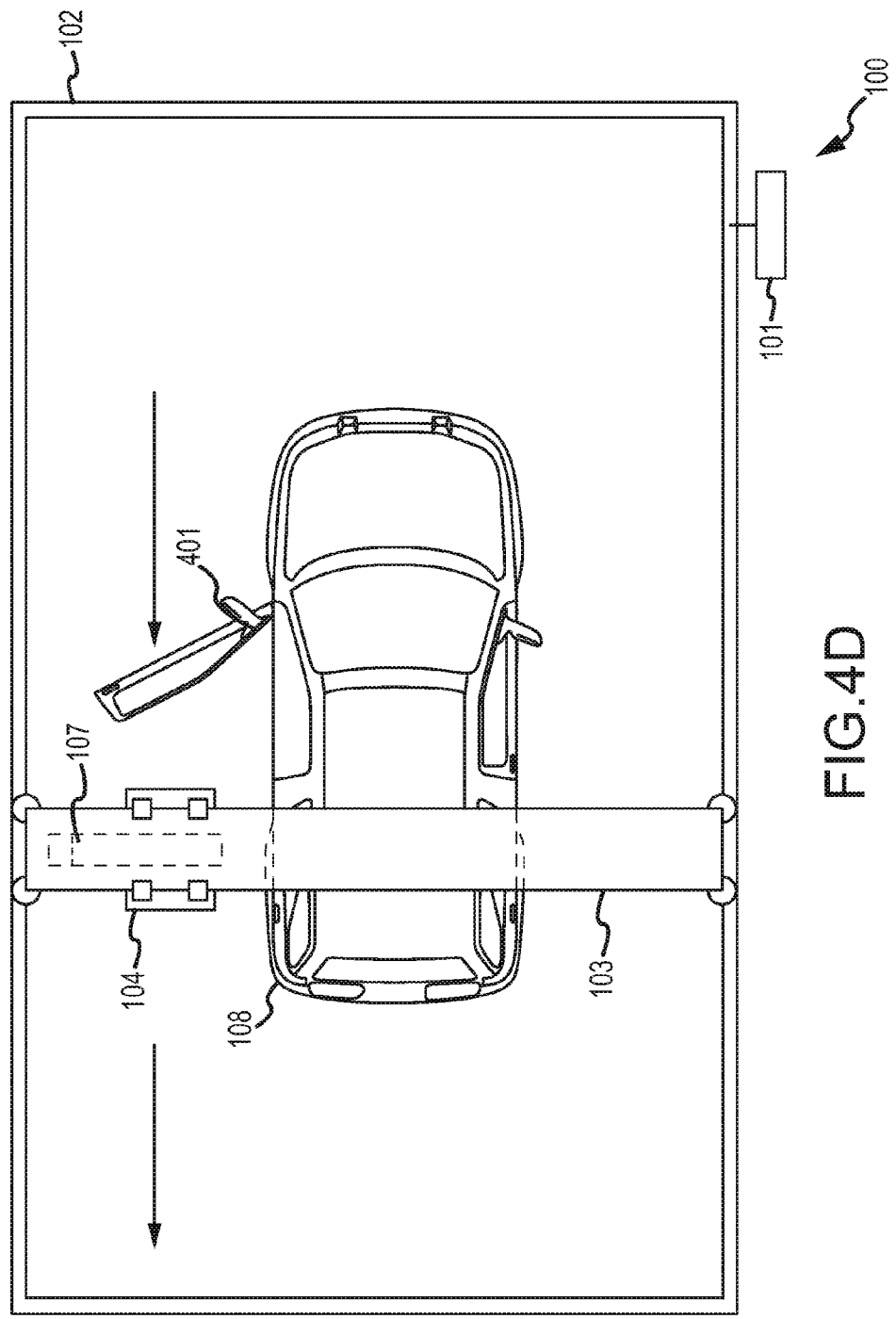

In a second example, FIG. 4A illustrates an impact between the vertical boom arm 107 and an obstruction on the driver side of the vehicle 108. The obstruction may be any kind of obstruction on the driver side of the vehicle such as a bike and/or ski rack mounted on the driver side of the vehicle 108, a side mirror, an open door, a spare tire mounted on the driver side of the vehicle 108, and so on. Regardless of the type of obstruction, the actual driver side perimeter of the vehicle 108 exceeds the assumed driver side perimeter. As illustrated, in this example the obstruction is an open driver side door 401 of the vehicle 108. When the control unit 101 determines that the impact illustrated in FIG. 4A has occurred, the control unit 101 may stop movement of the bridge 103. The control unit 101 may then move the bridge 103 in the opposite direction from the impact and move the trolley 104 to its farthest possible position on the bridge 103 along the orientation B away from the vehicle 108, as illustrated in FIG. 4B. Next, the control unit 101 may move the trolley 104 partway back on the bridge 103 along the orientation B toward the vehicle 108 to a new assumed driver side perimeter, as illustrated in FIG. 4C. The control unit 101 may then resume the wash process by moving the bridge 103 on the frame 102 along the orientation C utilizing the new assumed driver side perimeter, as illustrated in FIG. 4D. Although the present example describes the control unit 101 as moving the trolley 104 to its farthest possible position on the bridge 103 away from the vehicle 108 and then moving the trolley 104 partway back on the bridge 103 toward the vehicle 108 to a new assumed driver side perimeter, in other examples the control unit 101 may move the trolley 104 on the bridge 103 away from the vehicle 108 to the new assumed driver side perimeter without first moving the trolley 104 to its farthest possible position on the bridge 103 away from the vehicle 108.

Figure 5A:
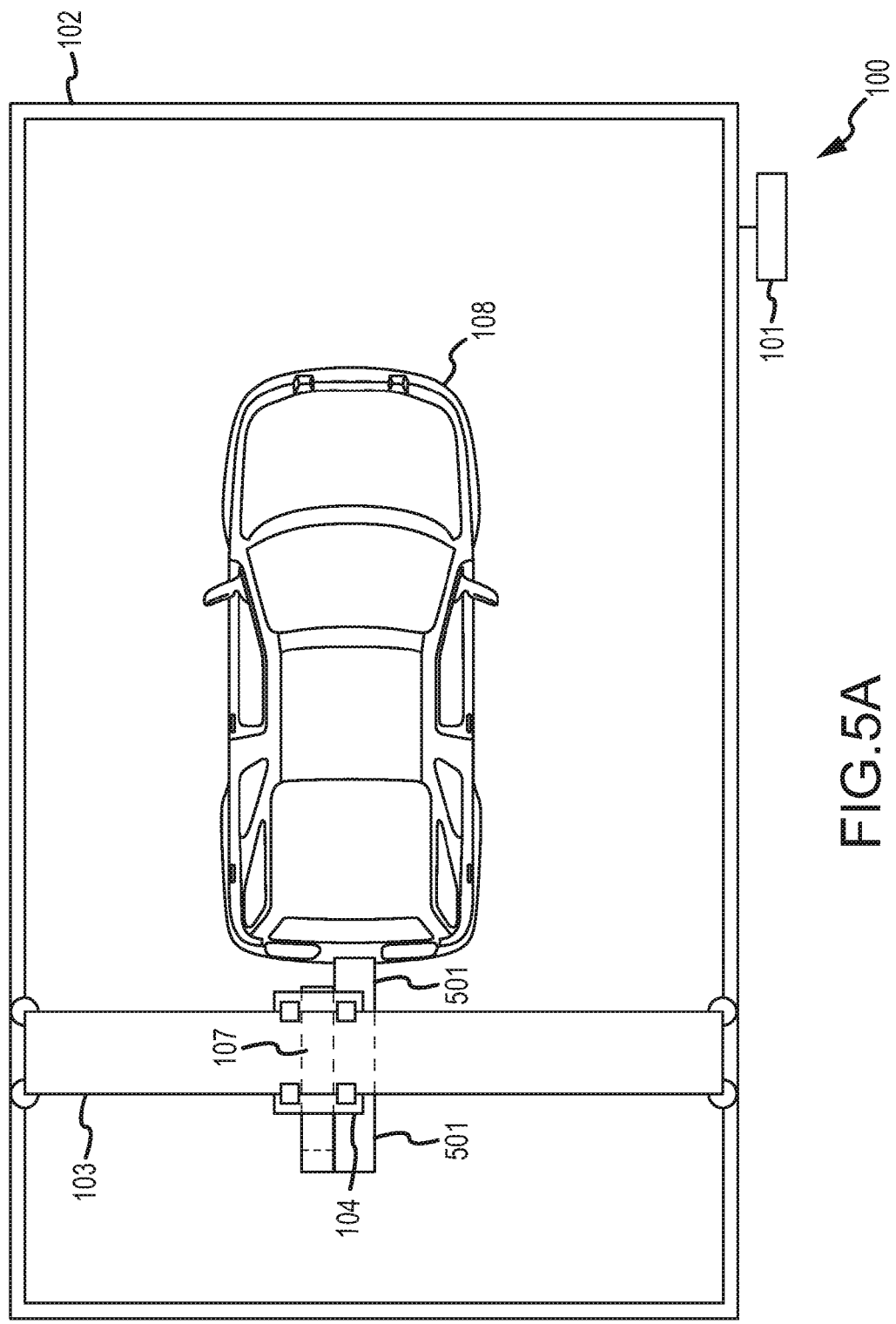
FIGS. 5A through 5D are top plan views of the automatic vehicle wash system of FIG. 1 illustrating a third kind of impact between a vertical boom arm and an obstruction during a wash process and continuance of the wash process after the impact.
Figure 5B:
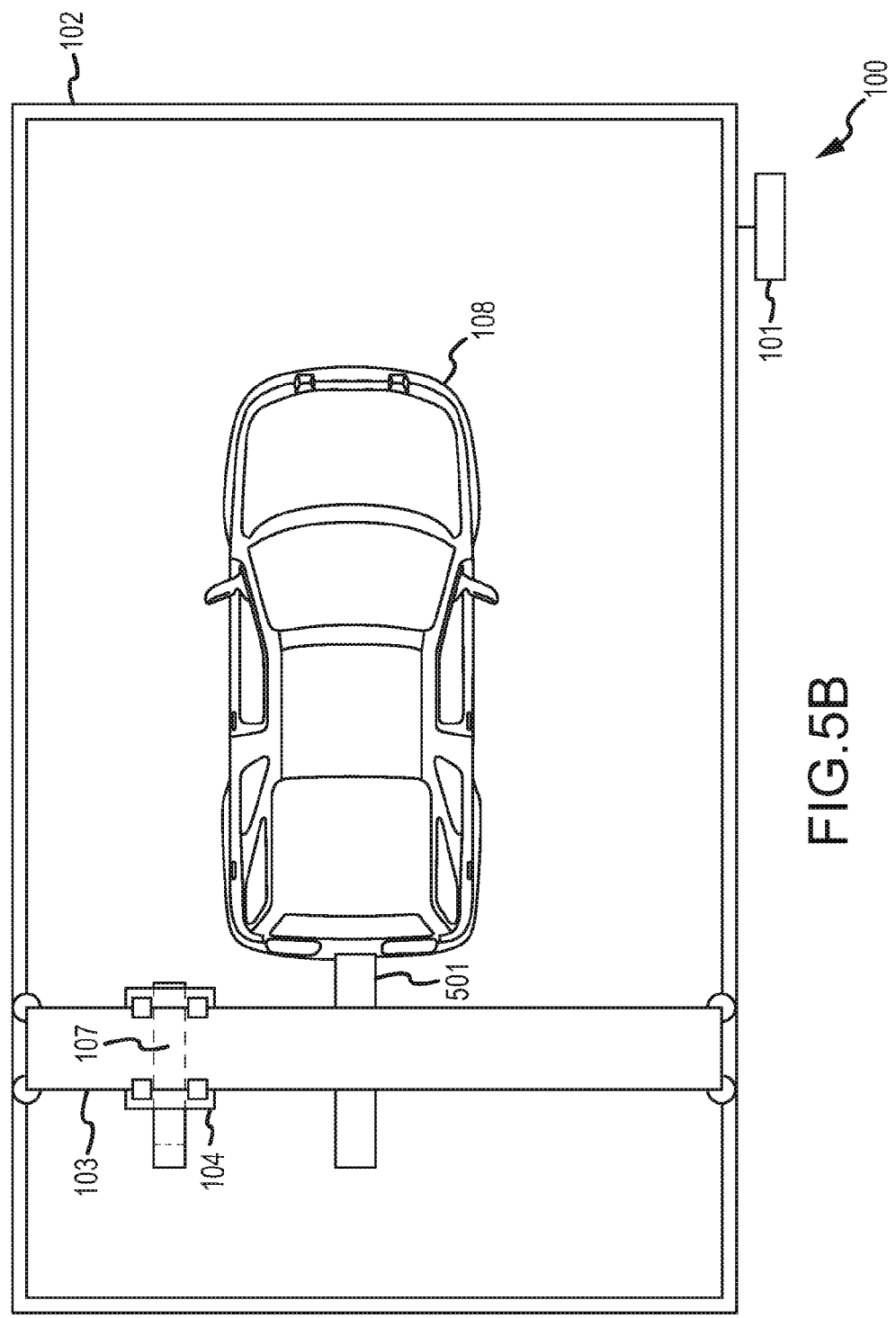
Figure 5C:
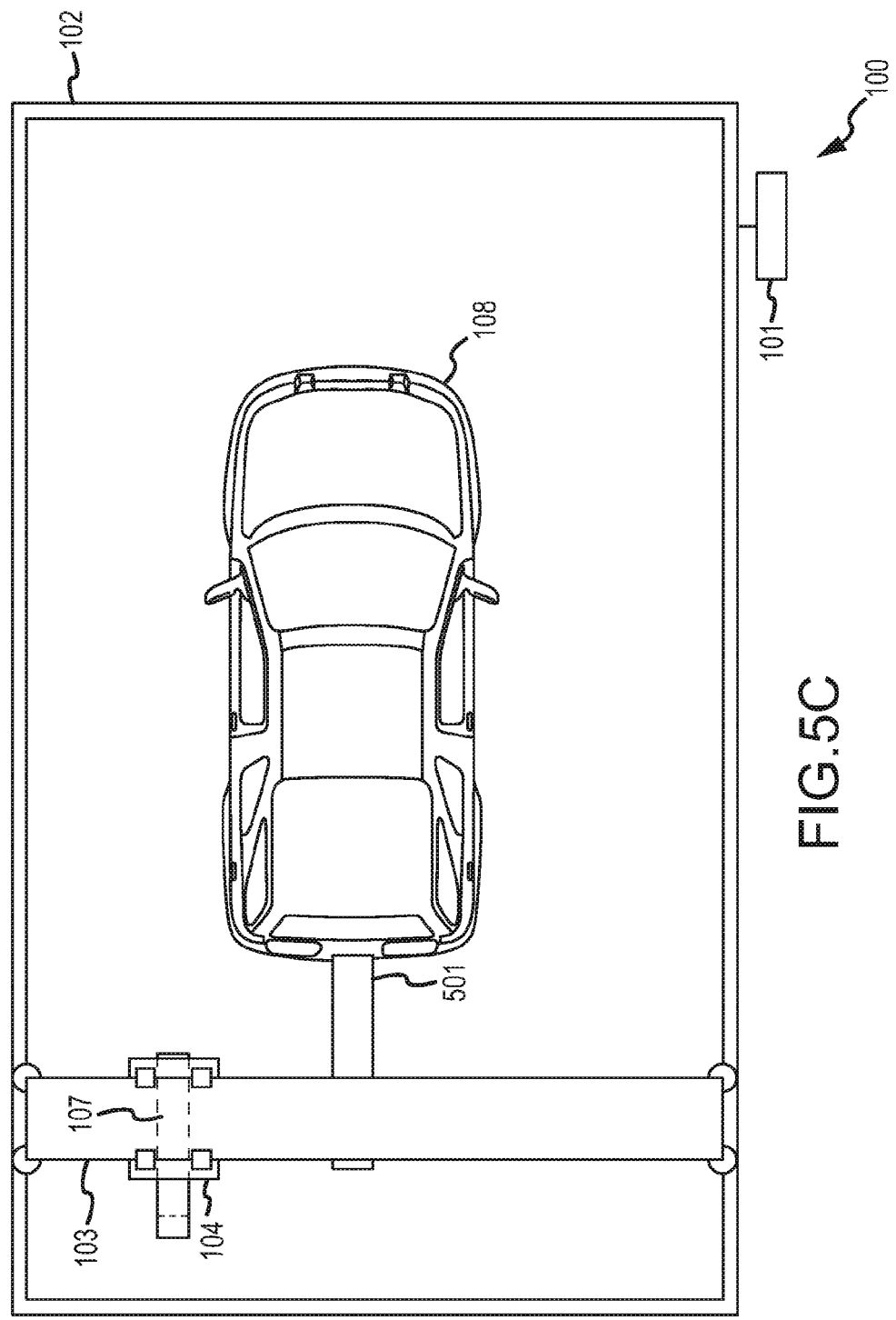
Figure 5D:
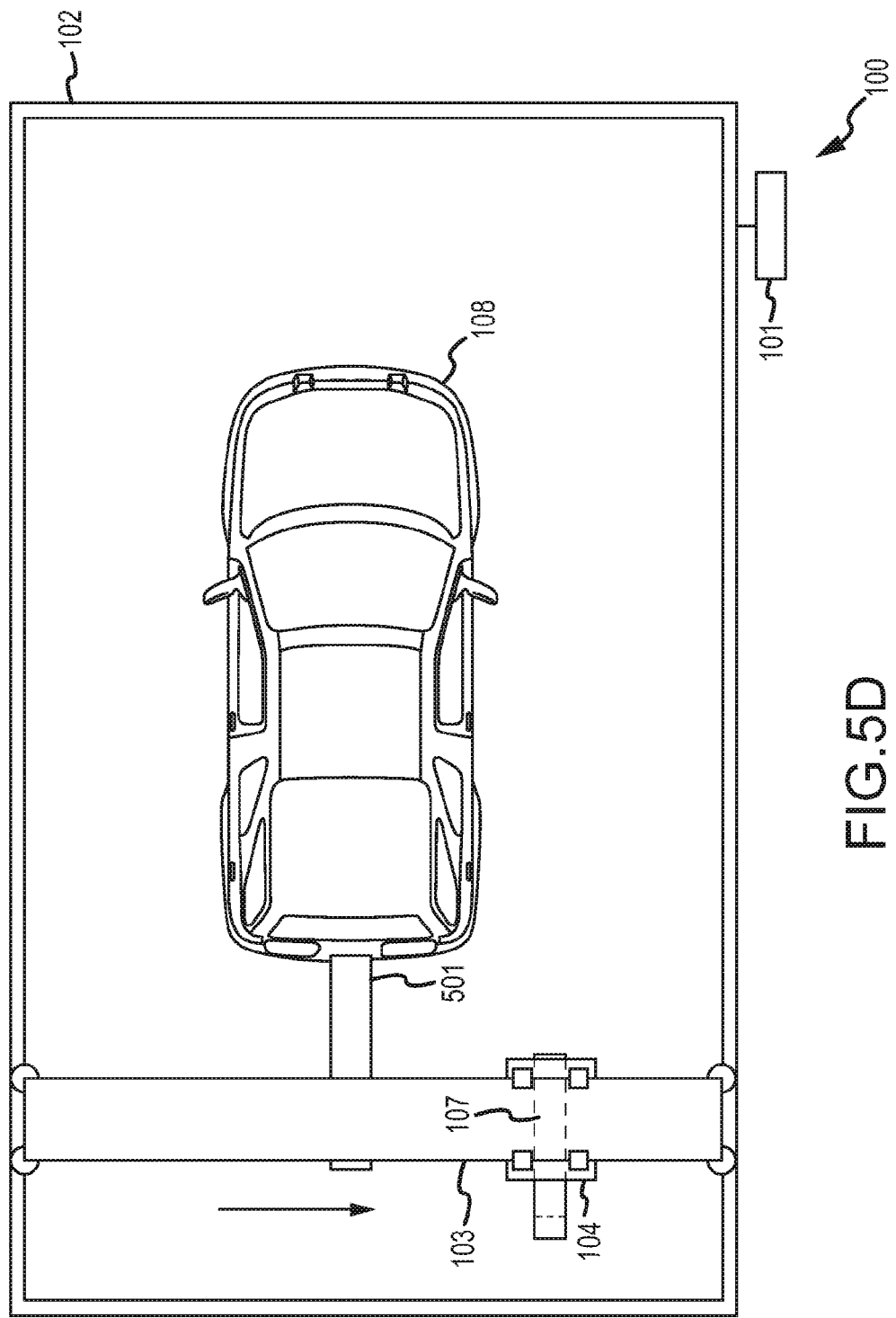

In a third example, FIG. 5A illustrates an impact between the vertical boom arm 107 and an obstruction on the back of the vehicle 108. The obstruction may be any kind of obstruction on the back of the vehicle such as a trailer hitch mounted on the back of the vehicle 108, a bike and/or ski rack mounted on the back of the vehicle 108, an irregular bumper of the vehicle 108, a spare tire mounted on the back of the vehicle 108, and so on. Regardless of the type of obstruction, the actual back perimeter of the vehicle 108 exceeds the assumed back perimeter. As illustrated, in this example the obstruction is spare tire 501 mounted on the back of the vehicle 108. When the control unit 101 determines that the impact illustrated in FIG. 5A has occurred, the control unit 101 may stop movement of the trolley 104 in its current direction and may move the trolley 104 in the opposite direction to its farthest possible position on the bridge 103 along the orientation B away from the vehicle 108, as illustrated in FIG. 5B. Next, the control unit 101 may move the bridge 103 on the inverted U-shaped housing frame 102 along the orientation C away the vehicle 108 to a new assumed back perimeter, as illustrated in FIG. 5C. The control unit 101 may then resume the wash process by moving the trolley 104 on the bridge 103 along the orientation B utilizing the new assumed back perimeter, as illustrated in FIG. 5D.

Figure 6B:
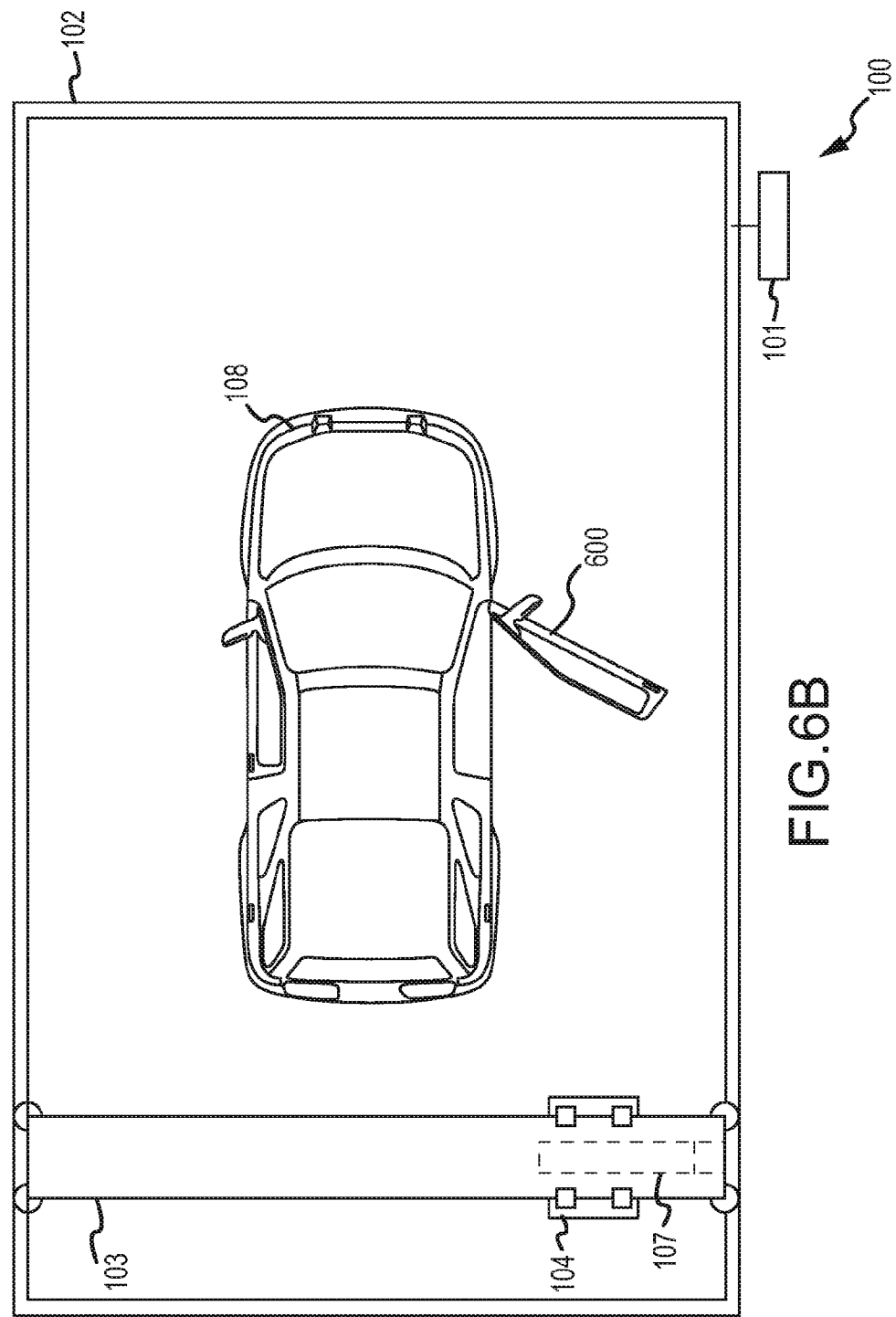
Figure 6C:
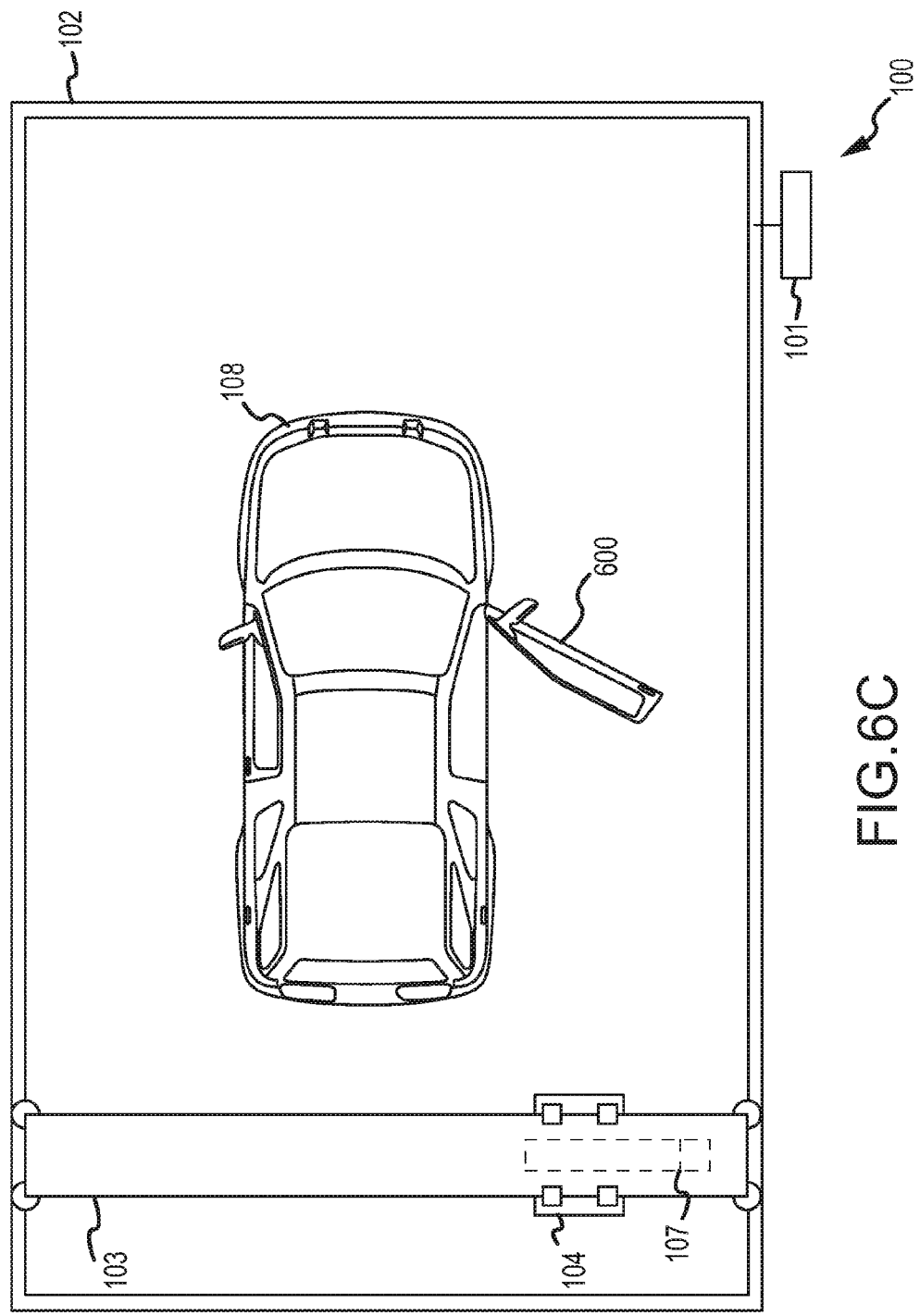
Figure 6D:
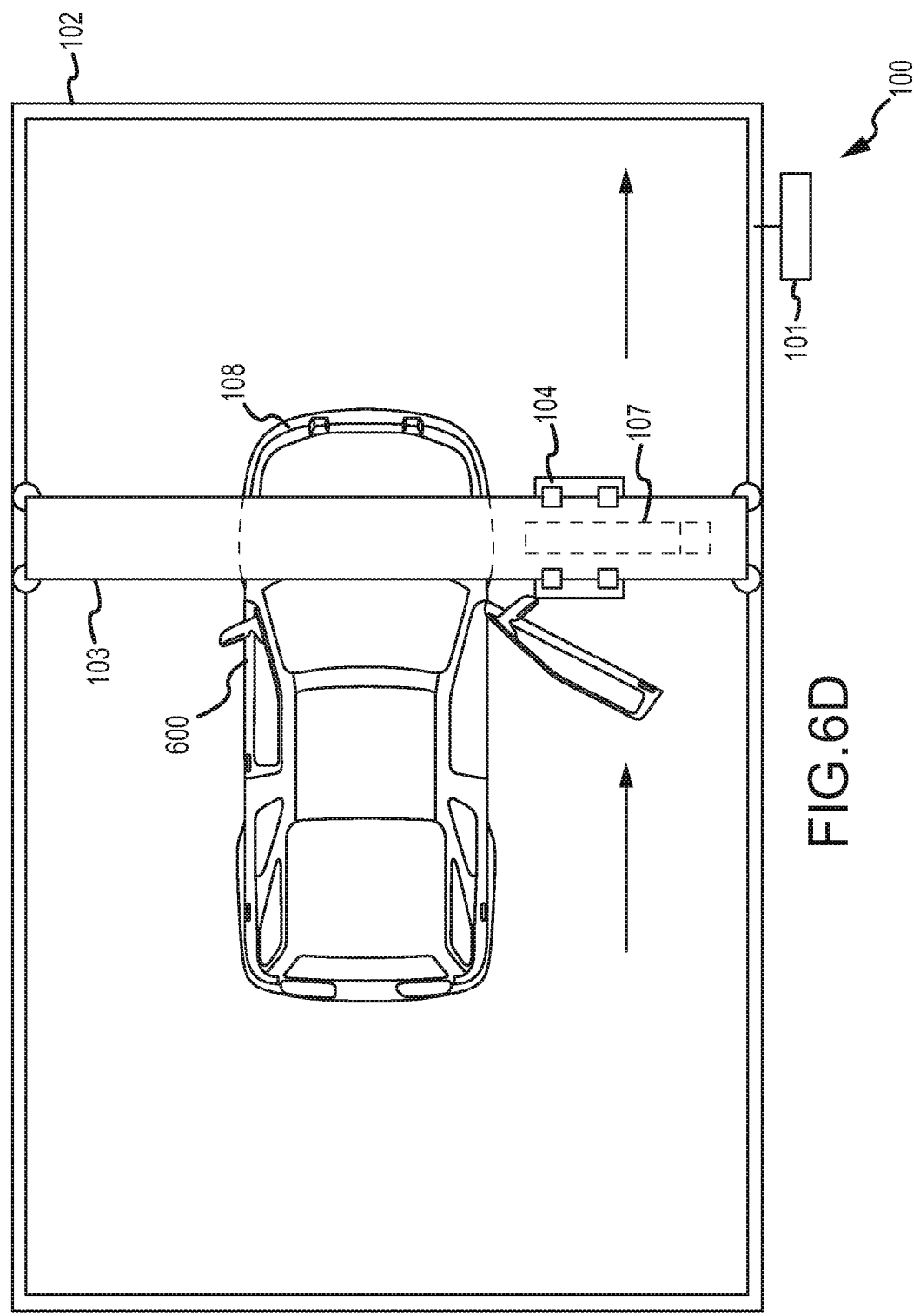

In a fourth example, FIG. 6A illustrates an impact between the vertical boom arm 107 and an obstruction on the passenger side of the vehicle 108. The obstruction may be any kind of obstruction on the passenger side of the vehicle such as a bike and/or ski rack mounted on the passenger side of the vehicle 108, a side mirror, an open door, a spare tire mounted on the passenger side of the vehicle 108, and so on. Regardless of the type of obstruction, the actual passenger side perimeter of the vehicle 108 exceeds the assumed passenger side perimeter. As illustrated, in this example the obstruction is an open passenger side door 601 of the vehicle 108. When the control unit 101 determines that the impact illustrated in FIG. 6A has occurred, the control unit 101 may stop movement of the bridge 103. The control unit 101 may then move the bridge 103 in the opposite direction from the impact and move the trolley 104 to its farthest possible position on the bridge 103 along the orientation B away from the vehicle 108, as illustrated in FIG. 6B. Next, the control unit 101 may move the trolley 104 partway back on the bridge 103 along the orientation B toward the vehicle 108 to a new assumed passenger side perimeter, as illustrated in FIG. 6C. The control unit 101 may then resume the wash process by moving the bridge 103 on the frame 102 along the orientation C utilizing the new assumed passenger side perimeter, as illustrated in FIG. 6D. Although the present example describes the control unit 101 as moving the trolley 104 to its farthest possible position on the bridge 103 away from the vehicle 108 and then moving the trolley 104 partway back on the bridge 103 toward the vehicle 108 to a new assumed passenger side perimeter, in other examples the control unit 101 may move the trolley 104 on the bridge 103 away from the vehicle 108 to the new assumed passenger side perimeter without first moving the trolley 104 to its farthest possible position on the bridge 103 away from the vehicle 108.

In some implementations, the vertical boom arm 107 may include a breakaway mechanism (see FIG. 11) (for example, a spring loaded ball detent) that is operable to disengage the vertical boom arm 107 when an impact occurs between the vertical boom arm 107 and a vehicle and/or another object that is a greater impact than the control unit 101 has the ability to correct for. In such implementations, the vertical boom arm 107 may include a breakaway target plate assembly and one or more breakaway sensors which detect when a breakaway has occurred by detecting vertical displacement of the breakaway target plate. If the control unit 101 determines that the breakaway sensor has detected a breakaway, the control unit 101 may abandon the current wash and remain dormant until the breakaway mechanism is reset and the automatic vehicle wash 100 is reset.

Figure 7:
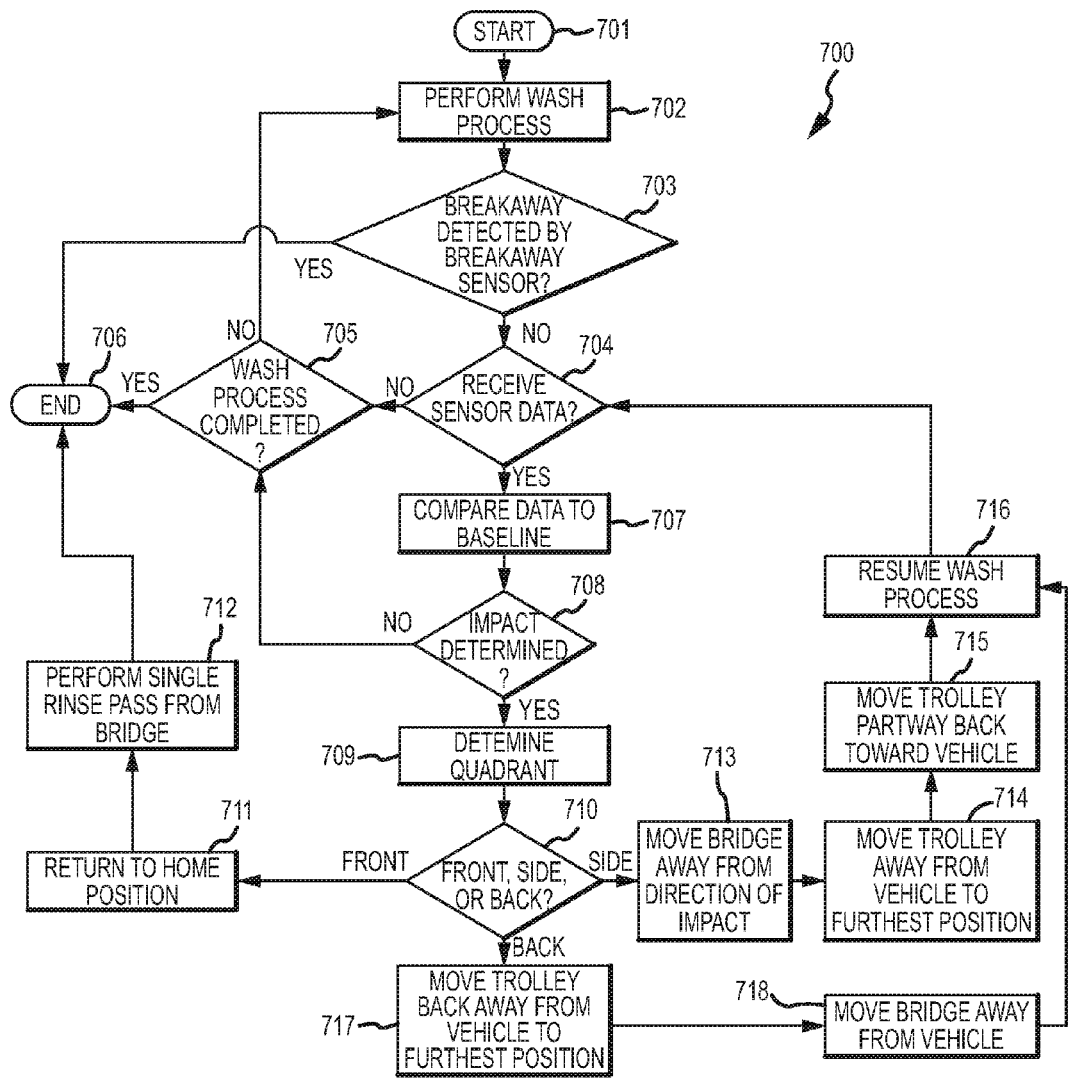
FIG. 7 is a flow chart illustrating a method of handling vertical boom arm impact in an automatic vehicle wash.

FIG. 7 is a flow chart illustrating a method 700 of handling vertical boom arm impact in an automatic vehicle wash system, which may be performed by the system 100. The method 700 begins at block 701 and proceeds to block 702, where the control unit 101 begins the wash process. From block 702, the flow proceeds to block 703 where the control unit determines whether data from one or more breakaway sensors indicates whether a breakaway mechanism of the vertical boom arm 107 has broken away. If the control unit 101 determines that the breakaway sensor does not indicate that the breakaway mechanism of the vertical boom arm 107 has not broken away, the flow proceeds to block 704. Otherwise, the flow proceeds to block 706 and ends.

At block 704, the control unit 101 determines whether data from one or more sensors has been received. If data has not been received, the flow proceeds to block 705. If data has been received, the flow proceeds to block 707.

At block 705, the control unit 101 determines whether the wash process has completed. If the wash process has not completed, the flow returns to block 702. If the wash process has completed, the flow proceeds to block 706 and ends.

At block 707, the control unit 101 compares the data that has been received from the one or more sensors to a baseline and the flow proceeds to block 708. At block 708, the control unit 101 determines, based on the comparison in block 707, whether an impact has occurred. If the control unit 101 determines that an impact has not occurred, the flow proceeds to block 705. If the control unit 101 determines that an impact has occurred, the flow proceeds to block 709.

At block 709, the control unit 101 determines which quadrant the vertical boom arm 107 was in when the impact occurred. As the control unit 101 controls which quadrant the vertical boom arm 107 is in by controlling the motion of the bridge 103 and/or the trolley 104, the control unit 101 may determine the quadrant that the vertical boom arm 107 is in by determining what directions the control unit 101 has issued to the bridge 103 and/or the trolley 104. The flow then proceeds to block 710. If the control unit 101 determines that the vertical boom arm 107 is located in the quadrant of the wash bay associated with the front of the vehicle 108, the flow proceeds to block 711. If the control unit 101 determines that the vertical boom arm 107 is located in either the quadrant of the wash bay associated with the driver side of the vehicle 108 or the quadrant of the wash bay associated with the passenger side of the vehicle 108, the flow proceeds to block 713. If the control unit 101 determines that the vertical boom arm 107 is located in the quadrant of the wash bay associated with the back of the vehicle 108, the flow proceeds to block 717.

At block 711, the control unit 101 returns the bridge 103, trolley 104, and the vertical boom arm 107 to a home position and the flow proceeds to block 712. The control unit 101 may return the bridge 103, trolley 104, and vertical boom arm 107 to the home position as the system 100 may not be capable of moving the bridge 103, trolley 104, and vertical boom arm 107 sufficiently away from the front of the vehicle 108 to continue the wash process utilizing the vertical boom arm 107. In implementations where the system 100 is capable of moving the bridge 103, trolley 104, and vertical boom arm 107 sufficiently away from the front of the vehicle 108, the control unit 101 may move the bridge 103, trolley 104, and vertical boom arm 107 to a new assumed front perimeter and continue the wash process utilizing the vertical boom arm 107. At block 712, the control unit 101 performs a single rinse pass of the vehicle 108 utilizing the bridge 103. The flow then proceeds to block 706 and ends.

At block 713, the control unit 101 moves the bridge 103 in the opposite direction of the impact and the flow proceeds to block 714. At block 714, the control unit 101 moves the trolley 104 to its furthest position away from the vehicle 108 on the bridge 103 and the flow proceeds to block 715. At block 715, the control unit moves the trolley 104 partway back toward the vehicle 108 on the bridge 103 to a new assumed side perimeter position (corresponding to the side of the vehicle 108 on which the control unit 101 determined the impact occurred) and the flow proceeds to block 716.

At block 717, the control unit 101 moves the trolley 104 to its furthest position away from the vehicle 108 on the bridge 103 and the flow proceeds to block 718. At block 718, the control unit moves the bridge 103 away from the vehicle 108 to a new assumed back perimeter position and the flow proceeds to block 716. At block 716, the control unit 101 resumes the wash process and the flow returns to block 703 to await further breakaway sensor data.

Figure 8A:
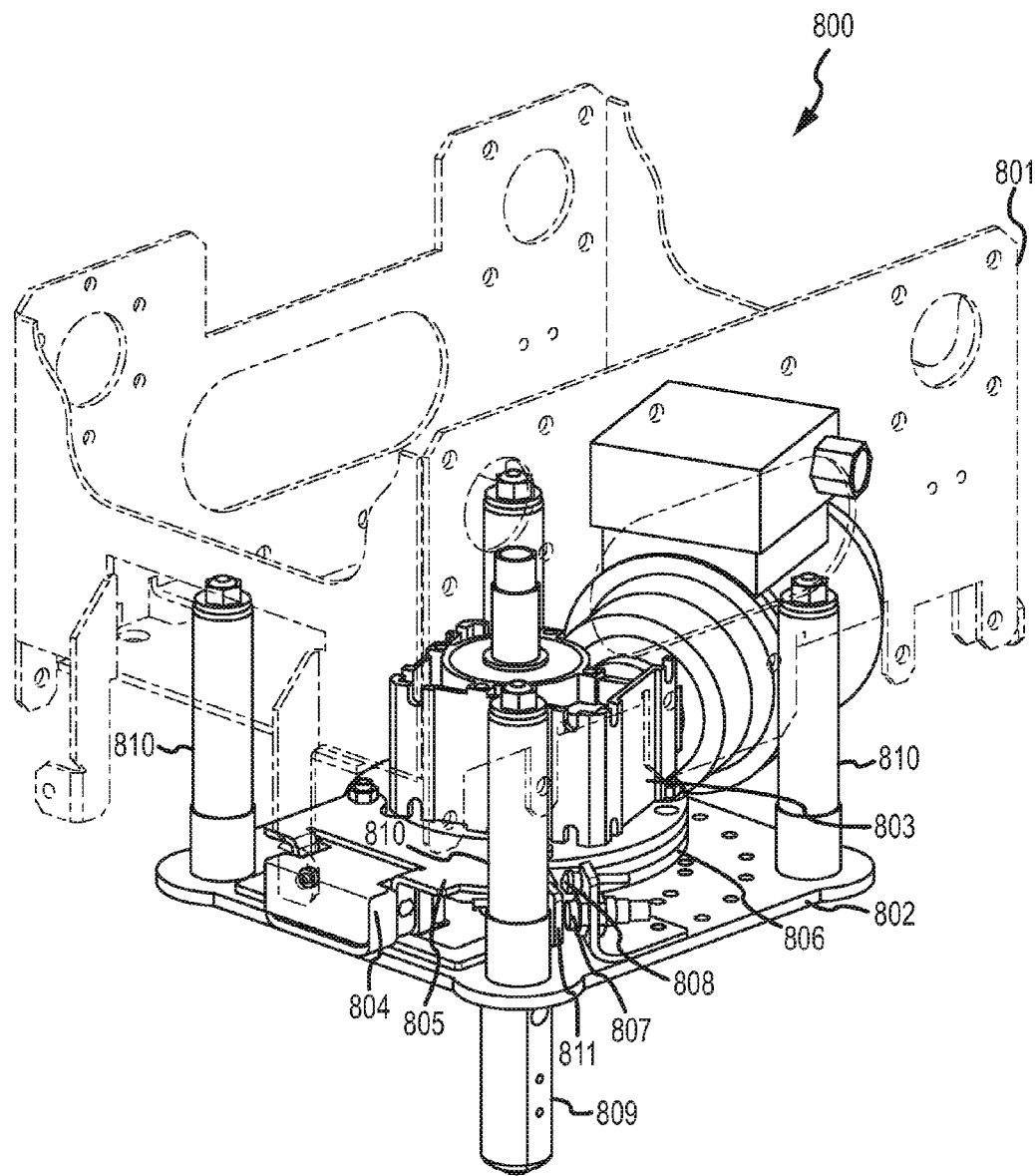
FIG. 8A is a close-up fragmentary isometric view, with parts removed for clarity, of a first embodiment of a flexible vertical boom arm attachment assembly that may be utilized in the system of FIG. 1 in accordance with the present disclosure.

FIGS. 8A through 8F illustrate a close-up view of an assembly 800 wherein a motor mount plate 806 is flexibly attached to a trolley 801 that may be utilized in the system 100 according to a first embodiment of the present disclosure. FIG. 8A illustrates an isometric view of the assembly 800, showing the motor mount plate 806 flexibly attached to the trolley 801, removed from the system 100 for clarity. As illustrated, the assembly 800 includes a lower trolley plate 802 that is fixedly attached to the trolley 801 by fixed attachment posts 810. Also as illustrated, the assembly 800 includes the motor mount plate 806 which is flexibly attached to the lower trolley plate 802 via a rotation bearing assembly. A arm rotation motor 803 is fixedly attached to the motor mount plate 806 and is operable to rotate the arm shaft 809. A spring return plate 805 is fixedly attached to the motor mount plate 806. The spring return plate 805 is operable to engage a spring return 804 to bias the motor mount plate 806 to resist rotation on the rotation bearing assembly with respect to the lower trolley plate 802.

However, if force is exerted on the motor mount plate 806 sufficient to compress the spring return 804, the motor mount plate 806 may rotate on the rotation bearing assembly with respect to the lower trolley plate 802 in the direction of the force. For example, if a vertical boom arm attached to the arm shaft 809 impacts a vehicle during the wash process, the force of the impact transfers up the arm shaft 809 to the motor mount plate 806 and may compress the spring return 804, rotating the motor mount plate 806 on the rotation bearing assembly with respect to the lower trolley plate 802 in the direction of the force. This may result in an angular displacement between the trolley 801 and the motor mount plate 806.

Figure 8B:
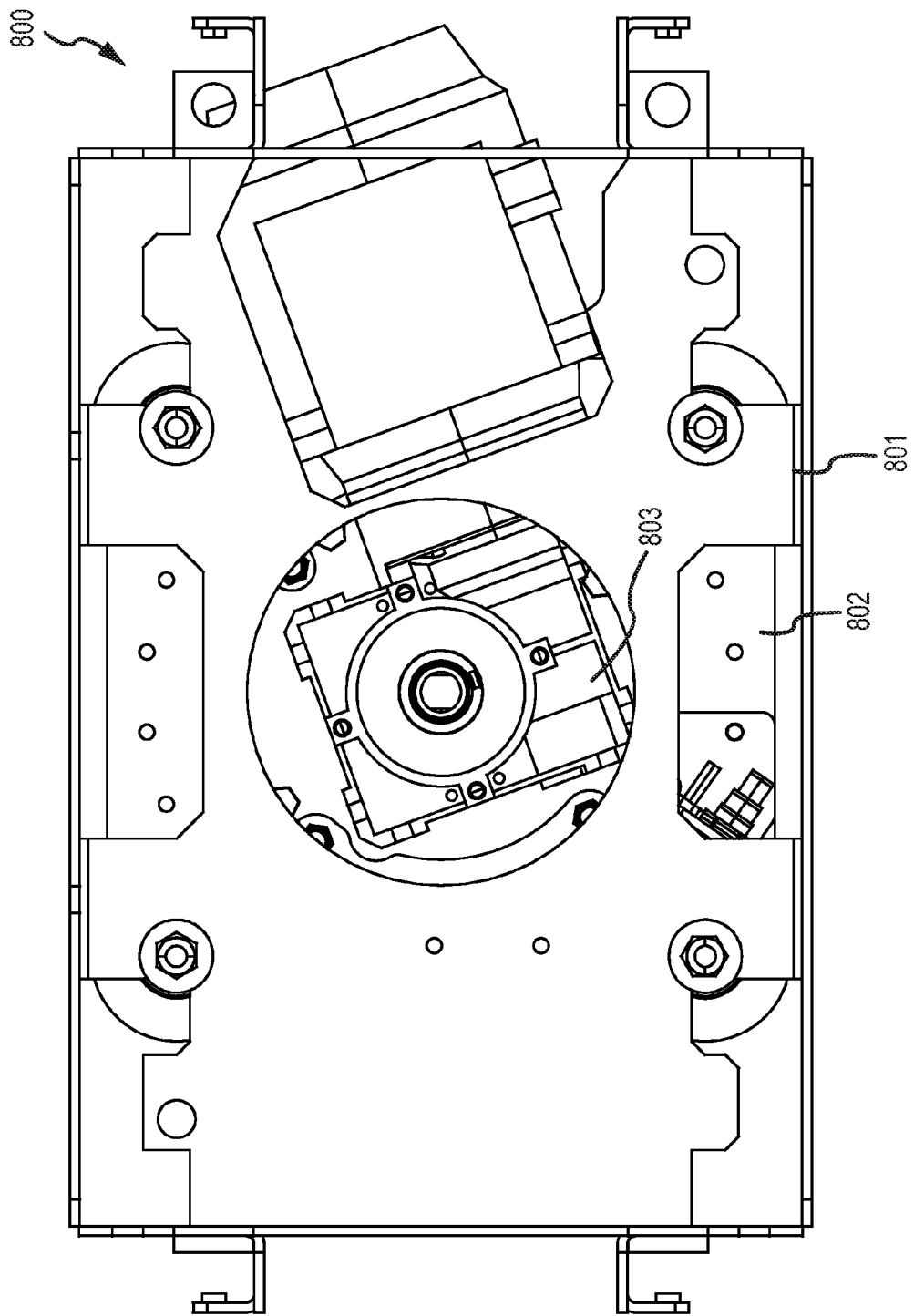
FIG. 8B is a top plan view of the flexible vertical boom arm attachment assembly of FIG. 8A.
Figure 8C:
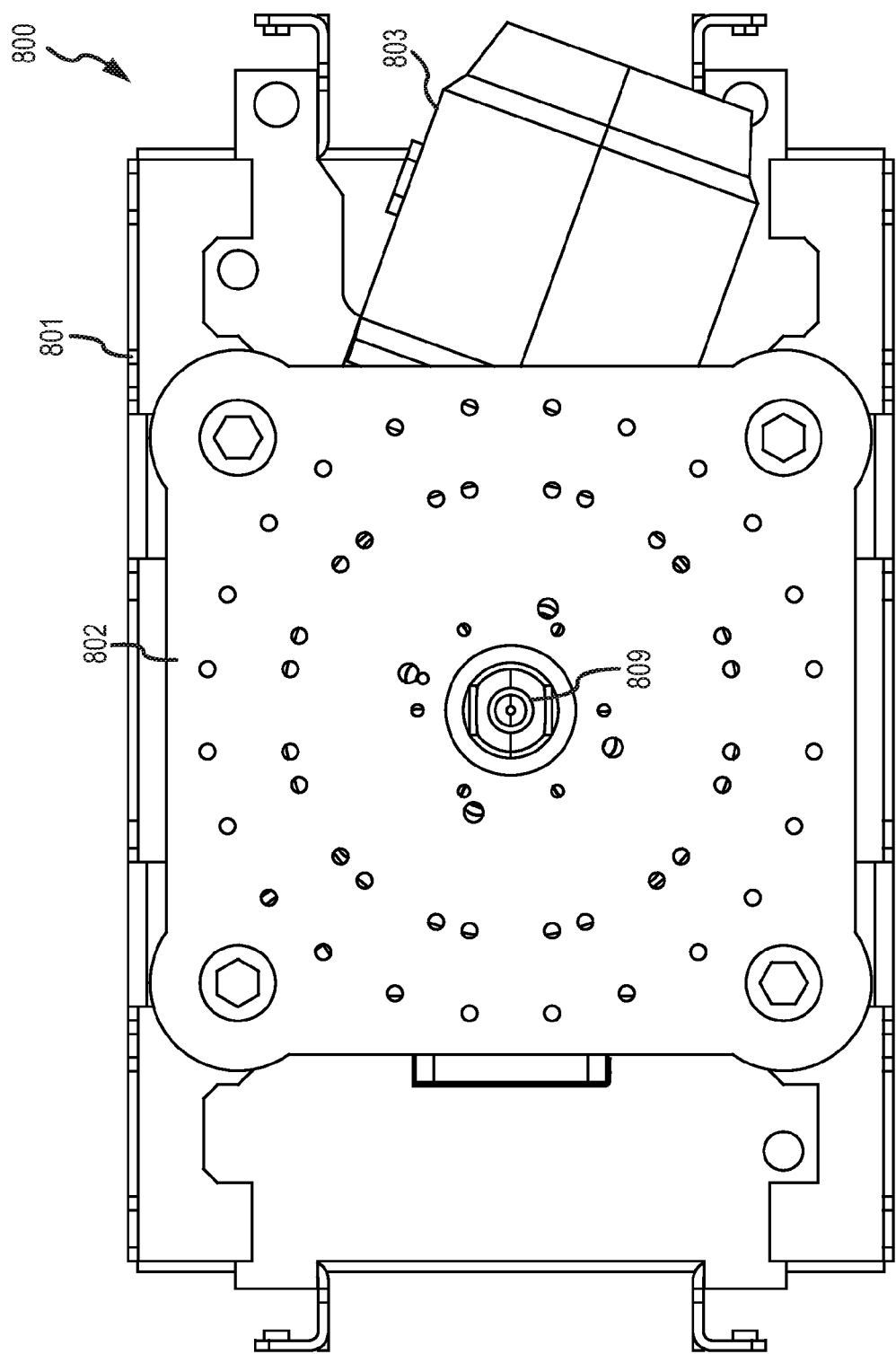
FIG. 8C is a bottom plan view of the flexible vertical boom arm attachment assembly of FIG. 8A.
Figure 8D:
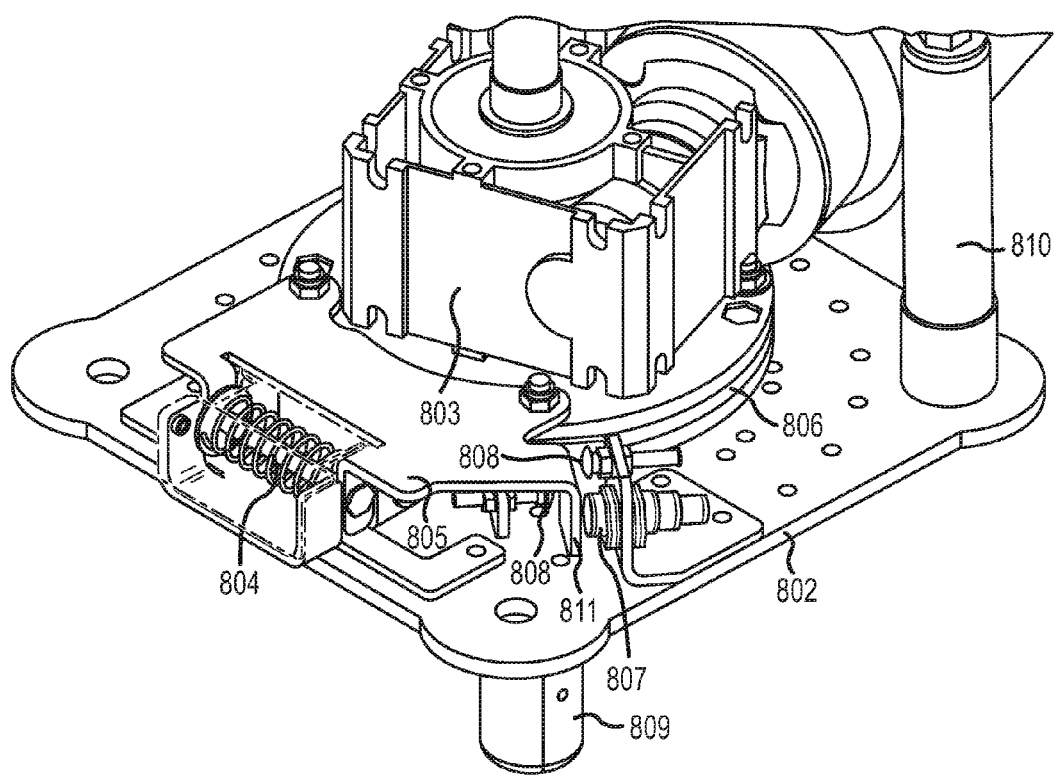
FIG. 8D is an enlarged fragmentary isometric view of the flexible vertical boom arm attachment assembly of FIG. 8A with parts removed for clarity.

FIG. 8B illustrates a top plan view of the assembly 800 of FIG. 8A. FIG. 8C illustrates a bottom plan view of the assembly 800 of FIG. 8A. FIG. 8D illustrates a close-up isometric view of the assembly 800 with the trolley 801 and several of the attachment posts 810 removed for clarity. The internal spring within spring return 804 is also illustrated for clarity. As illustrated, the spring return plate 805 includes a rotation sensor tab 811. Also as illustrated, the lower trolley plate 802 includes a proximity sensor 807 (which may be an analog proximity sensor, a digital proximity sensor, and so on) and gap stops 808. The proximity sensor 807 may detect movement of the rotation sensor tab 811 when the motor mount plate 806 rotates with respect to the trolley 801 (and thus the angular displacement between the motor mount plate 806 and the trolley 802) and may transmit data related to the amount of that movement, the rate of that movement, and the direction of that movement to a control unit. The gap stops 808 may prevent movement of the spring return plate 805 (and thus the motor mount plate 806) beyond a certain point in one or more directions, preventing actual impact between the rotation sensor tab 811 and the proximity sensor 807 and/or other components. The gap stops 808 may be adjustable to control the amount of movement the spring return plate 805 is allowed in one or more directions.

Thus, if a vertical boom arm attached to the arm shaft 809 impacts a vehicle during the wash process, the force of the impact turns transfers up the arm shaft 809 to the motor mount plate 806 and may compress the spring return 804, resulting in angular displacement of the motor mount plate 806 with respect to the trolley 802. The amount and rate of this displacement may be detected by the proximity sensor 807 measuring the proximity of the rotation sensor tab 811 and the proximity sensor 807 may transmit this data to a control unit.

Figure 8E:
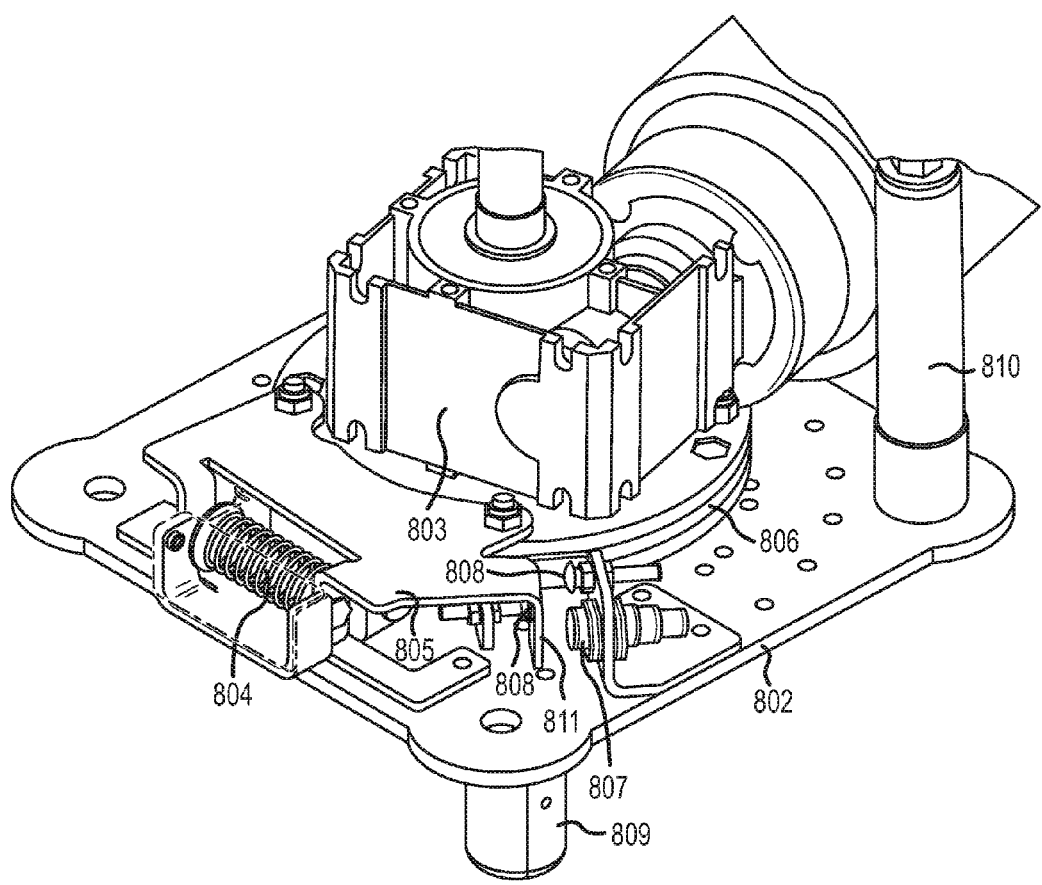
FIG. 8E is a view similar to FIG. 8D with the motor mount plate rotating in a first direction.
Figure 8F:
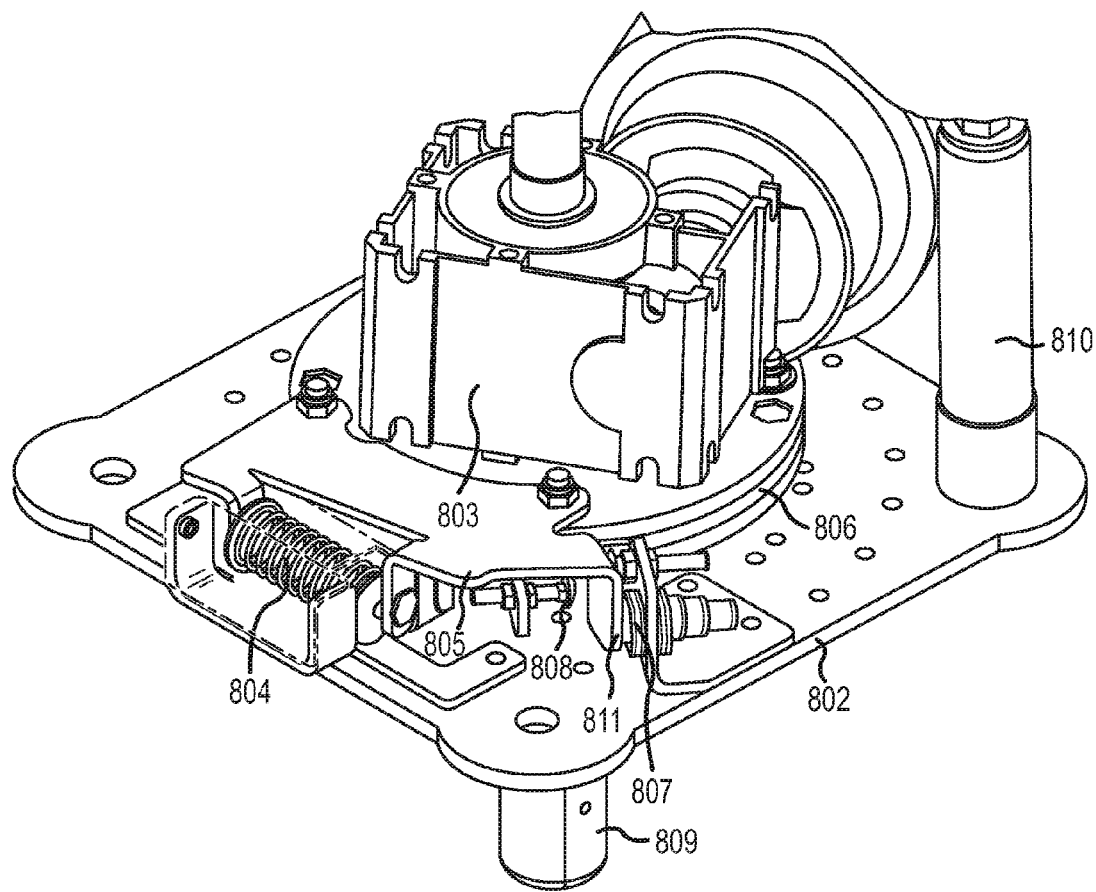
FIG. 8F is a view similar to FIG. 8D with the motor mount plate rotating in a second direction.

FIG. 8E illustrates the motor mount plate 806 rotating, due to force exerted upon a vertical arm boom coupled to the arm shaft 809 sufficient to compress the spring return 804, in a clockwise direction. The proximity sensor 807 detects that the rotation sensor tab 811 has moved further away, as well as the rate of movement of the rotation sensor tab 811, and transmits that measured data to a control unit. FIG. 8F illustrates the motor mount plate 806 rotating, due to force exerted upon a vertical arm boom coupled to the arm shaft 809 sufficient to compress the spring return 804, in a direction opposite to that illustrated in FIG. 8D. The proximity sensor 807 detects that the rotation sensor tab 811 has moved closer, as well as the rate of movement of the rotation sensor tab 811, and transmits that measured data to a control unit.

Figure 9A:
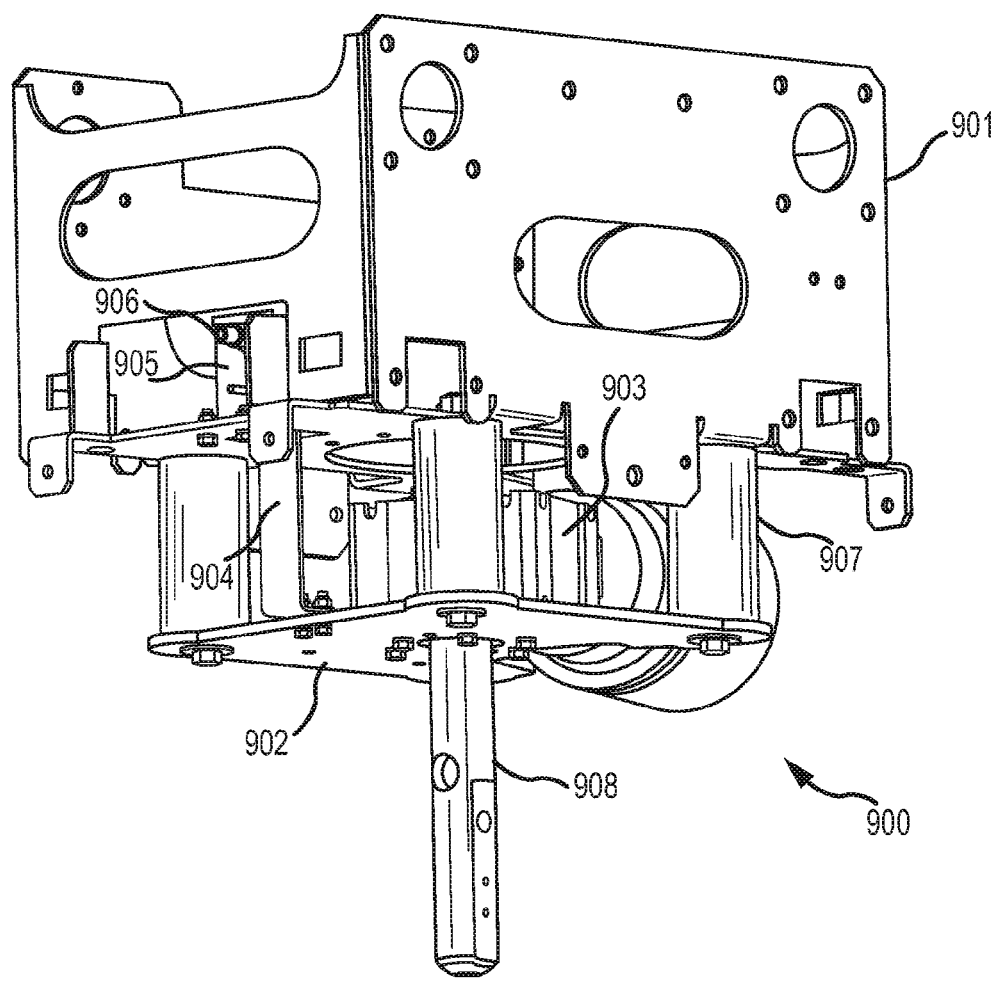
FIG. 9A is a close-up fragmentary isometric view, with parts removed for clarity, of a second embodiment of a flexible vertical boom arm attachment assembly that may be utilized in the system of FIG. 1 in accordance with the present disclosure.

FIGS. 9A through 9F illustrate a close-up view of an assembly 900 wherein a motor mount plate 902 is flexibly attached to a trolley 901 that may be utilized in the system 100 according to a second embodiment of the present disclosure. FIG. 9A illustrates an isometric view of the assembly 900, showing the motor mount plate 902 flexibly attached to the trolley 901, removed from the system 100 for clarity. As illustrated, the assembly 900 includes the motor mount plate 902 that is flexibly attached to the trolley 901 by flexible attachment posts 907 (which may be spring-biased, rubber mounts, and so on). Also, as illustrated, an arm rotation motor 903 is fixedly attached to the motor mount plate 902 and is operable to rotate the arm shaft 908. As further illustrated, an impact target plate 904 is fixedly attached the motor mount plate 902 and a portion of the impact target plate 904 extends through an aperture in the trolley 901.

Figure 9B:
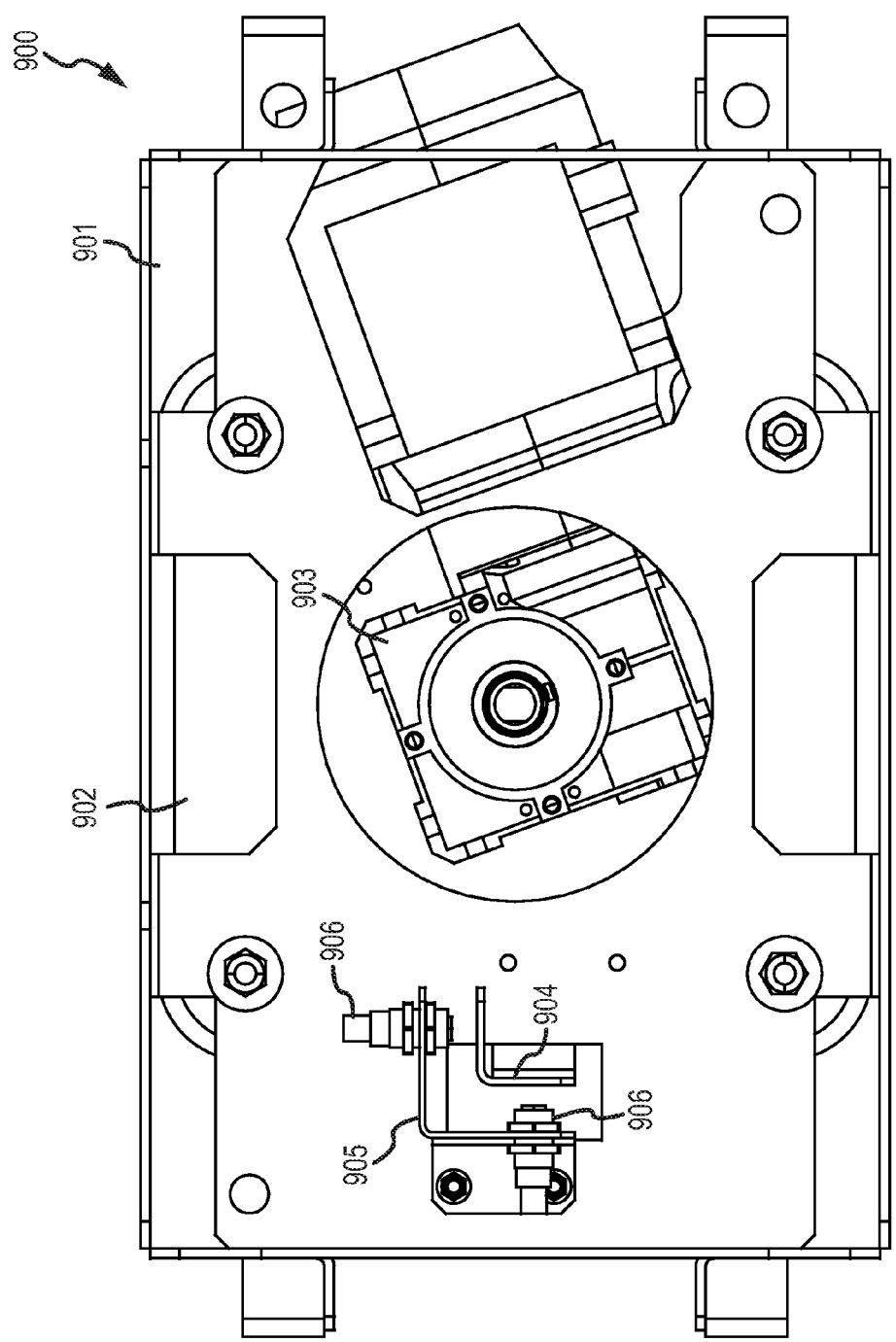
FIG. 9B is a top plan view of the flexible vertical boom arm attachment assembly of FIG. 9A.

FIG. 9B illustrates a top plan view of the assembly 900. As illustrated, the portion of the impact target plate 904 that extends through the aperture in the trolley 901 is L-shaped and is positioned to face an L-shaped sensor member 905 fixedly attached to the trolley. Proximity sensors 906 are mounted on the L-shaped sensor member 905 and are operable to detect two-dimensional (along x and y planes) movement (as well as the rate of that movement) between the impact target plate 904 and the L-shaped sensor member 905 and transmit the movement and rate of movement to a control unit. The proximity sensors 906 may be analog proximity sensors, digital proximity sensors, and so on.

For example, if a vertical boom arm attached to the arm shaft 908 impacts a vehicle during the wash process, the force of the impact transfers up the arm shaft 908 to the motor mount plate 902, displacing the motor mount plate 902 with respect to the trolley 901 in the direction of the force. One or more of the proximity sensors 906 may detect the two-dimensional (along x and y planes) displacement and rate of two-dimensional displacement by detecting the change in position (and rate of change) between one or more of the proximity sensors 906 and the impact target plate 904. One or more of the proximity sensors 906 may transmit data regarding the two-dimensional displacement and rate of displacement to a control unit. The L-shaped sensor member 905 may include one or more gap stops 909 (see FIG. 9D) positioned at least partially in the gap between the L-shaped sensor member 905 and the impact target plate 904 to prevent the impact target plate 904 from directly impacting the proximity sensors 906. The gap stops 909 may be adjustable to control how close the impact target plate 904 can come to the proximity sensors 906.

Figure 9C:
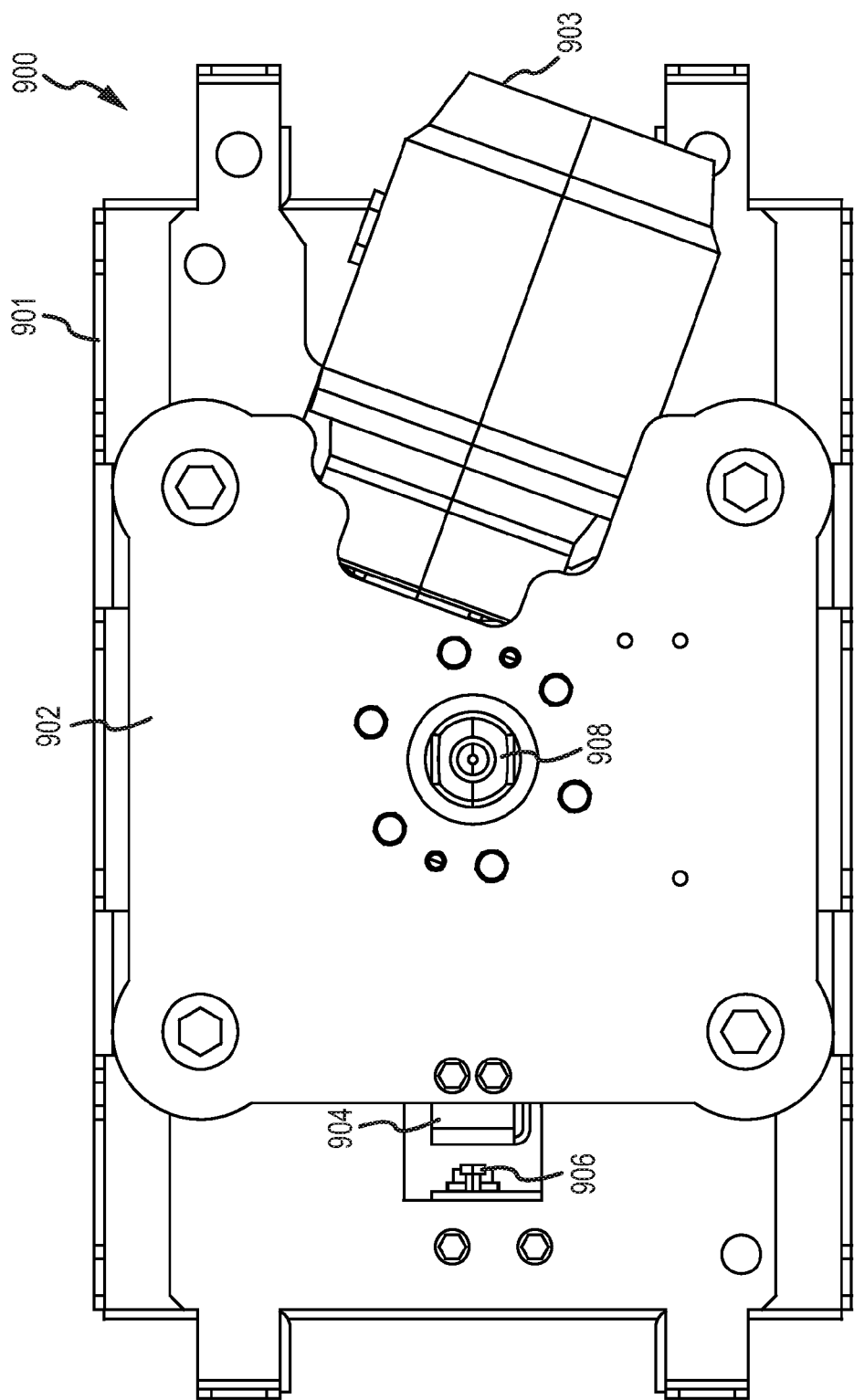
FIG. 9C is a bottom plan view of the flexible vertical boom arm attachment assembly of FIG. 9A.
Figure 9D:
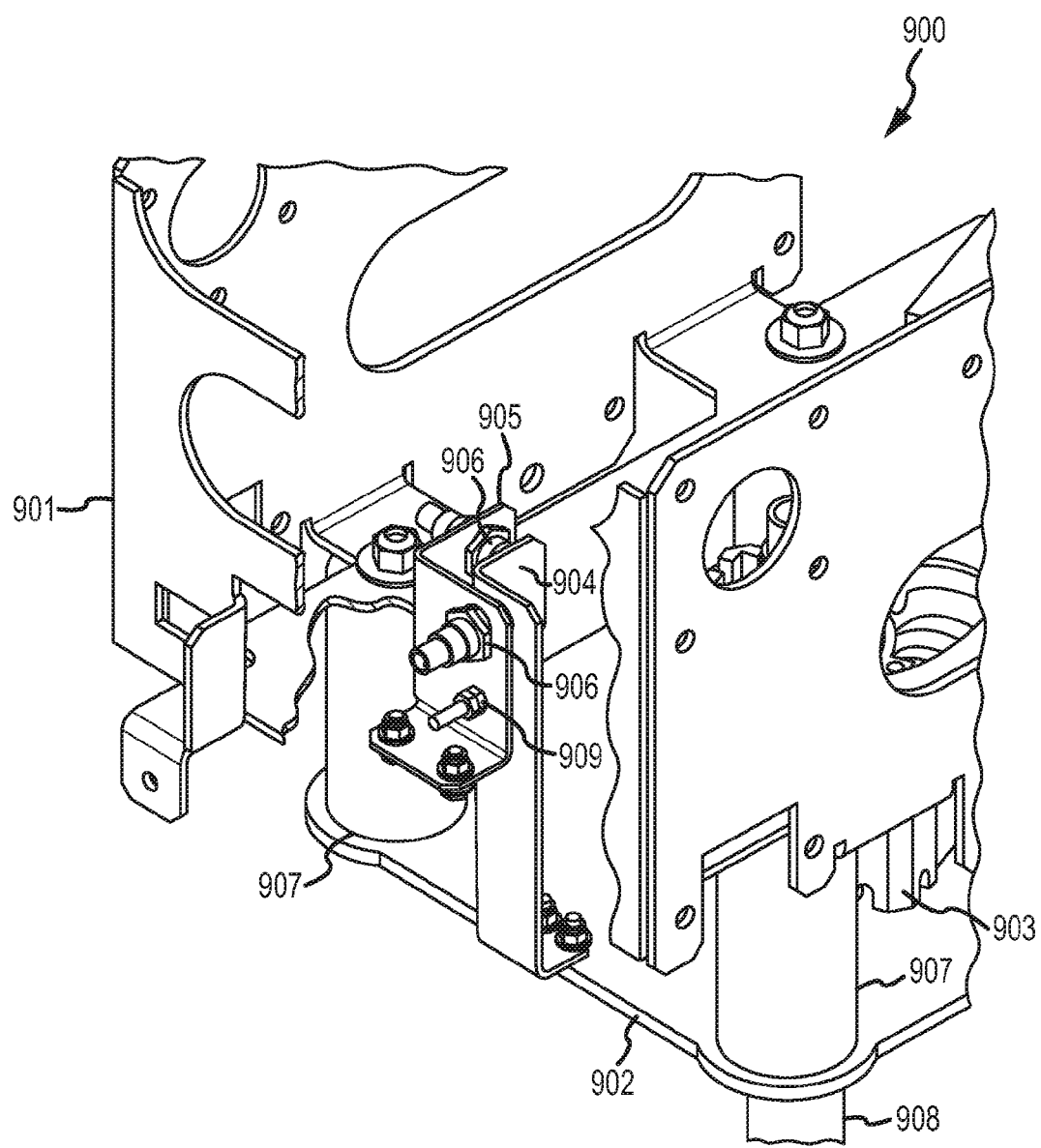
FIG. 9D is an enlarged fragmentary isometric view of the flexible vertical boom arm attachment assembly of FIG. 9A with portions of the trolley cut away for clarity.

FIG. 9C illustrates a bottom plan view of the assembly 900 of FIG. 9A. FIG. 9D illustrates a close-up isometric view of the assembly 900 of FIG. 9A with portions of the trolley 901 cut away to better illustrate the impact target plate 904 and the L-shaped sensor member 905.

Figure 9E:
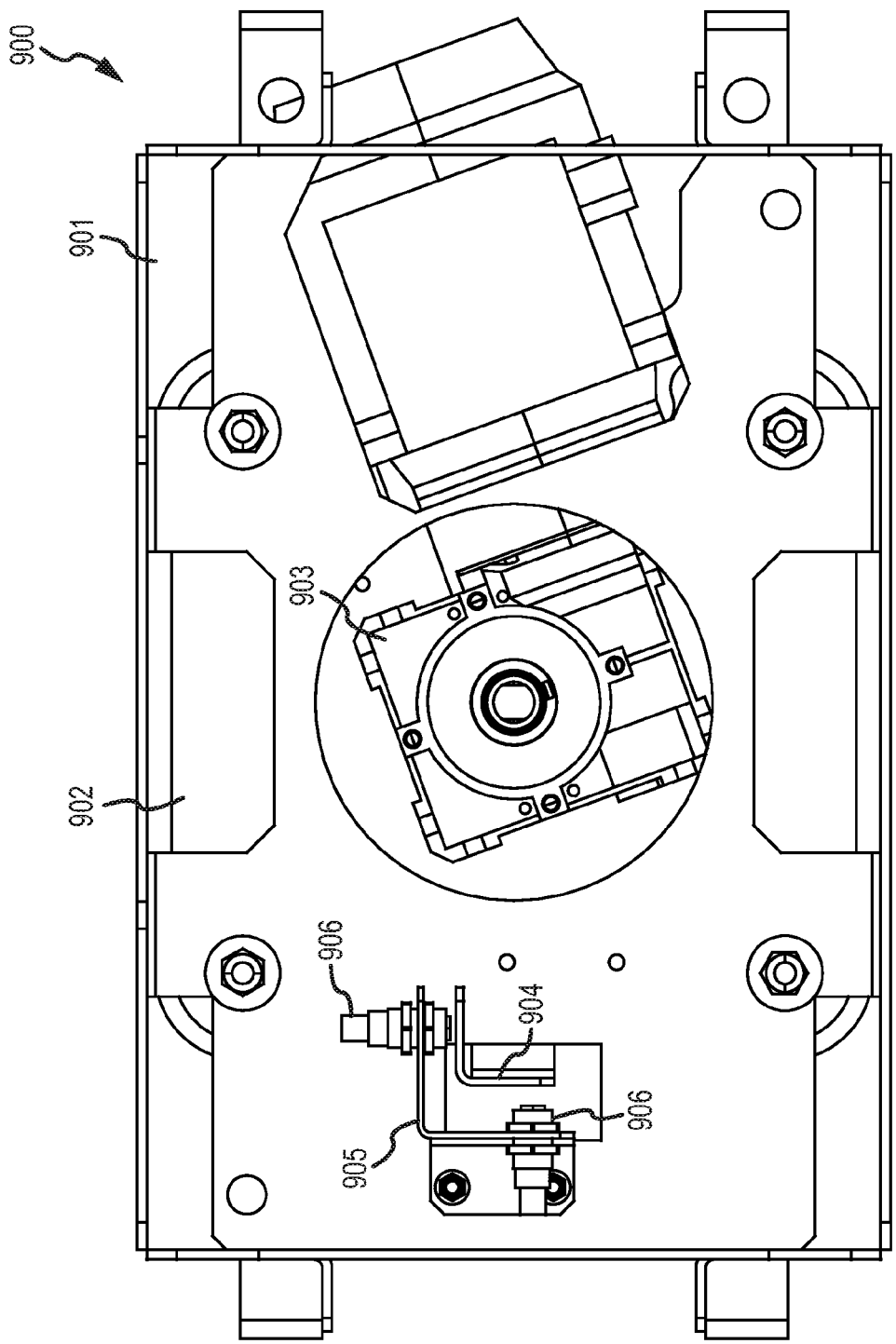
FIG. 9E is a view similar to FIG. 9B with illustrating motion of the impact target plate toward the L-shaped sensor member in a first direction.
Figure 9F:
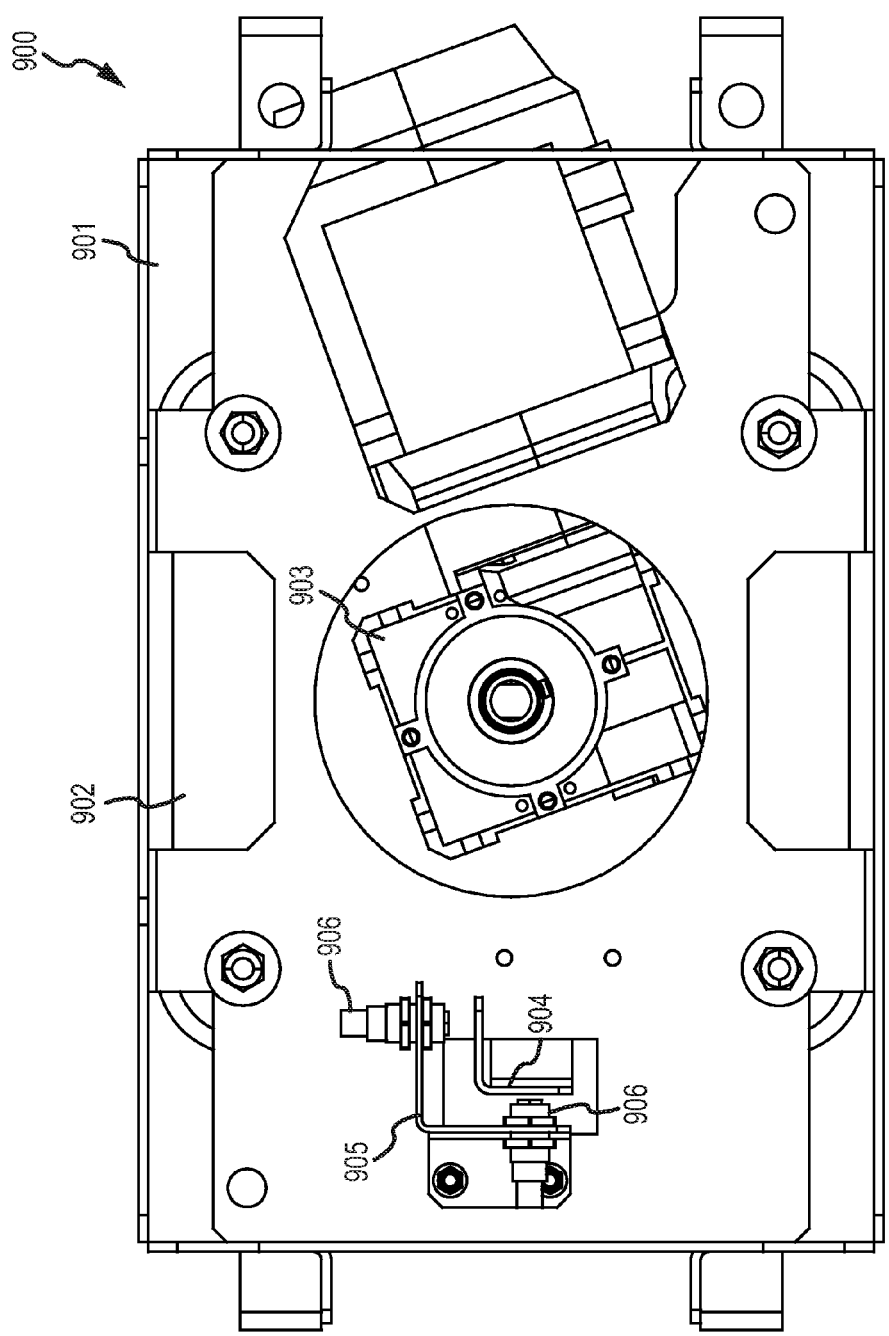
FIG. 9F is a view similar to FIG. 9B with illustrating motion of the impact target plate toward the L-shaped sensor member in a second direction.

FIG. 9E illustrates a top plan view of the assembly 900 of FIG. 9A showing two-dimensional displacement of the motor mount plate 902 in a first two-dimensional direction with respect to the trolley 901 resulting in movement of the impact target plate 904 closer to the top positioned proximity sensor 906. The top positioned proximity sensor 906 detects that the impact target plate 904 has moved closer, as well as the rate of movement of the impact target plate 904, and transmits that measured data to a control unit. FIG. 9F illustrates a top plan view of the assembly 900 of FIG. 9A showing two-dimensional displacement of the motor mount plate 902 in a second two-dimensional direction with respect to the trolley 901 resulting in movement of the impact target plate 904 closer to the lower positioned proximity sensor 906. The lower positioned proximity sensor 906 detects that the impact target plate 904 has moved closer, as well as the rate of movement of the impact target plate 904, and transmits that measured data to a control unit. Although FIGS. 9E and 9F illustrate two-dimensional displacement of the motor mount plate 902 with respect to the trolley 901 resulting in movement of the impact target plate 904 closer to one of the proximity sensors 906, it is understood that an impact may cause two-dimensional displacement of the motor mount plate 902 with respect to the trolley 901 which may result in the impact target plate 904 has moved further away from one of the proximity sensors 906, moved further away from both of the proximity sensors 906, moved closer to both of the proximity sensors 906, and so on. In such cases, one or more of the proximity sensors 906 may detect the movement, as well as the rate of movement, and transmit data about the movement to a control unit.

Figure 10:
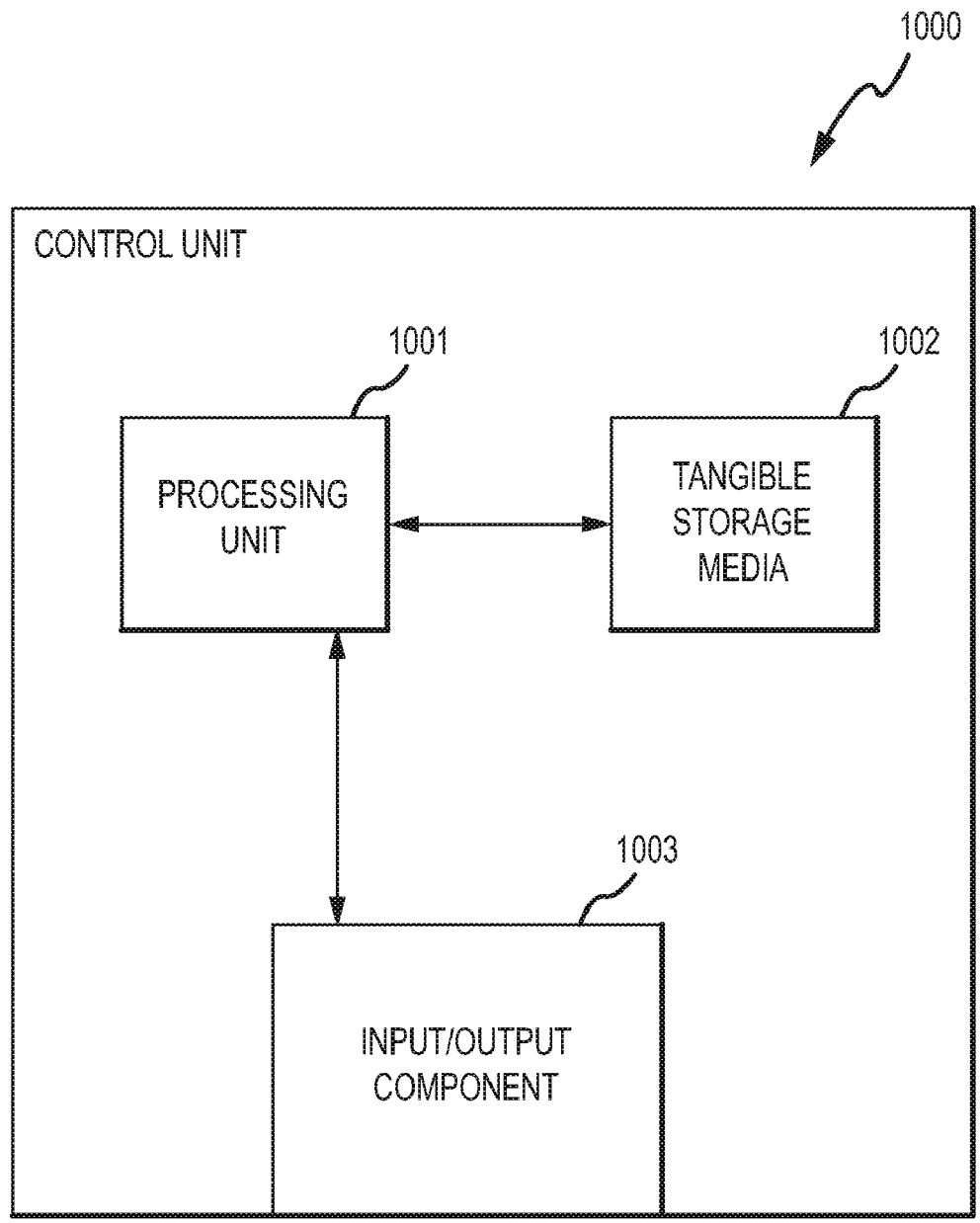
FIG. 10 is block diagram of an exemplary control unit that may be utilized in the system of FIG. 1 in accordance with the present disclosure.

FIG. 10 illustrates an exemplary control unit 1000 that may be utilized in the system of FIG. 1 in accordance with the present disclosure. As illustrated, the control unit 1000 may include at least one processing unit 1001, tangible storage media 1002, and input/output component 1003. The tangible storage media 1002 may include any kind of tangible storage media including, but not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions. The control unit 1000 may be operable to perform the method of FIG. 7 by executing one or more instructions stores in the tangible storage media 1002.

Figure 11:
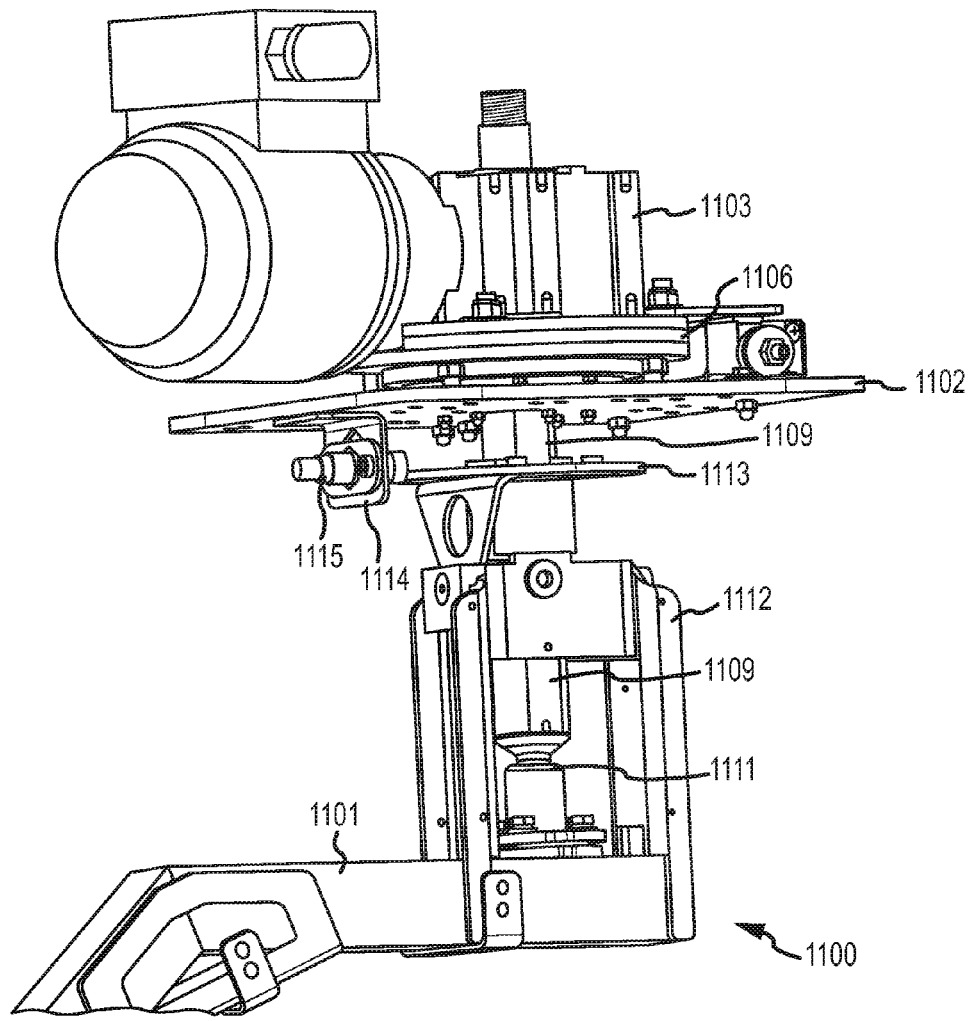
FIG. 11 is a fragmentary, isometric view, with parts removed for clarity, of an exemplary breakaway mechanism assembly that may be utilized in a flexible vertical boom arm attachment assembly, such as the flexible vertical boom arm attachment assemblies of FIGS. 8A-8F and/or 9A-9F.

FIG. 11 is a close-up fragmentary isometric view, with parts removed for clarity, of an exemplary breakaway mechanism assembly 1100 that may be utilized in a flexible vertical boom arm attachment assembly, such as the flexible vertical boom arm attachment assemblies of FIGS. 8A-8F and/or 9A-9F.

As illustrated in this particular example, a vertical boom arm 1101 may be rotatably connected to an arm rotation motor 1103 via an arm shaft 1109. The arm roation motor may be attached to a motor mount plate 1106 which is flexibly attached to a lower trolley plate 1102 of a trolley (not shown for clarity). The vertical boom arm 1101 may be connected to the arm shaft 1109 via a mounting assembly 1112 and a breakaway attachment mechanism 1111.

As illustrated, in this example, the breakaway attachment mechanism 111 may be a spring loaded ball detent. Further, the mounting assembly 1112 may include a breakaway target plate assembly 1113 and the lower trolley plate 1102 may include a sensor mounting assembly 1114 with one or more proximity sensors 1115. The proximity sensor 1115 may be configured to detect proximity of the breakaway target plate assembly 1113 and may thus detect data regarding vertical movement of the breakaway target plate assembly 1113.

When the vertical boom arm 1101 is involved in an impact that occurs with sufficient force that a control unit of the trolley is unable to correct for, the breakaway attachment mechanism 111 may be configured to disengage the vertical boom arm 1101 from the arm shaft 1109, such as by disengaging the spring loaded ball detent from the arm shaft 1109. Disengaging of the vertical boom arm 1101 from the arm shaft 1109 may cause the breakaway target plate assembly 1113 to displace vertically from the proximity sensor 1115. As a result, the proximity sensor 1115 may detect that a breakaway has occurred and may abandon the current wash, remain dormant until the breakaway mechanism is reset and the automatic vehicle wash is reset, and/or otherwise cease movement in order to prevent damage to a vehicle and/or the automatic vehicle wash.

Although the present disclosure has been described with a certain degree of particularity, it is understood the disclosure has been made by way of example and changes in detail or structure may be made without departing from the spirit of the disclosure as defined in the appended claims.

The technology described herein may be at least partially implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein may be referred to variously as operations, steps, objects, engines, or modules. Furthermore, it should be understood that logical operations may be performed in any order, unless explicitly claimed otherwise or a specific order is inherently necessitated by the claim language.

In some implementations, articles of manufacture may be provided as computer program products that cause the instantiation of operations on a computer system to implement one or more portions of the disclosure. One implementation of a computer program product provides a computer program storage medium readable by a computer system and encoding a computer program.

The above specification, examples, and data provide a complete description of the structure and use of exemplary embodiments of the disclosure. Although various embodiments of the disclosure have been described above with a certain degree of particularity, or with reference to one or more individual embodiments, those skilled in the art could make numerous alterations to the disclosed embodiments without departing from the spirit or scope of this disclosure. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosure as defined in the following claims.

What is claimed is:

1. A system for handling boom arm impact in an automatic vehicle wash, comprising
  a bridge that is operable to reciprocate along a first orientation, the first orientation substantially parallel to a lengthwise orientation of a vehicle in a wash bay;
  a trolley, moveably coupled to the bridge, the trolley operable to reciprocate on the bridge along a second orientation, the second orientation substantially parallel to a widthwise orientation of the vehicle in the wash bay;
  a motor mount that is pivotally attached to the trolley;
  an arm rotation motor mounted on the motor mount;
  a sensor mounted on the trolley;
  a boom arm that is rotatably attached to the motor mount such that the boom arm is rotatable under control of the rotation motor with respect to the trolley; and
  a control unit operable to
    receive from the sensor during an automatic wash process one or both of an angular displacement between the trolley and the motor mount or a displacement velocity between the trolley and the motor mount;
    determine whether a boom arm impact has occurred to cause the angular displacement or displacement velocity by comparing the angular displacement or the displacement velocity to a baseline; and
    relocate the boom arm if the boom arm impact is determined.

2. The system of claim 1 further comprising
  a first member rotatably mounted to a second member that is fixedly attached to the trolley; and
  a bias member attached between the first and the second member that biases against rotation; and
  wherein the sensor comprises at least one proximity sensor operable to detect angular displacement between the first and second members by measuring a proximity of the at least one proximity sensor to a sensor member operable to change when the first member rotates.

3. The system of claim 1, wherein the control unit relocates the boom arm differently based on a quadrant of the wash bay the boom arm is located within.

4. The system of claim 3, wherein the control unit relocates the boom arm when the boom arm is located in a quadrant of the wash bay associated with a front of the vehicle by moving one or more of the boom arm, the trolley, or the bridge to a position occupied at the start of the automatic wash process.

5. The system of claim 4, wherein the control unit continues the automatic wash process after relocating the boom arm utilizing a spray mechanism other than the boom arm.

6. The system of claim 3, wherein
the control unit relocates the boom arm when the boom arm is located in a quadrant of the wash bay associated with a back of the vehicle by
moving the trolley on the bridge along the second orientation away from the boom arm impact; and
moving the bridge along the first orientation away from the vehicle; and
the control unit continues the automatic wash process after relocating the boom arm.

7. The system of claim 3, wherein
the control unit relocates the boom arm when the boom arm is located in a quadrant of the wash bay associated with either a passenger side of the vehicle or a driver side of the vehicle by
moving the bridge along the first orientation away from the boom arm impact; and
moving the trolley along the second orientation away from the vehicle; and
the control unit continues the automatic wash process after relocating the boom arm.

8. The system of claim 1, wherein the control unit further prematurely ends the automatic wash process.

9. The system of claim 1, wherein the baseline comprises either or both of
an expected displacement between the trolley and the motor mount or
an expected displacement velocity between the trolley and the motor mount, each of which is related to one or more of the following:
movement of the bridge during the automatic wash process;
movement of the trolley during the automatic wash process;
rotation of the boom arm during the automatic wash process; or
thrust of one or more spray nozzles during the automatic wash process.

10. The system of claim 1, wherein the control unit utilizes different baselines based on which quadrant of the wash bay the boom arm is located within.

11. The system of claim 1, wherein
the boom arm is rotatably attached to the motor mount via a breakaway mechanism that is operable to disengage the boom arm from the motor mount when the boom arm is involved in an impact of sufficient force;
disengagement of the boom arm from the motor mount causes a breakaway target assembly to displace with respect to a breakaway sensor that is mounted on the trolley; and
the control unit halts movement of the boom arm in response to detection of the displacement of the breakaway target assembly by the breakaway sensor.

12. A system for handling boom arm impact in an automatic vehicle wash, comprising
a bridge that is operable to reciprocate along a first orientation, the first orientation substantially parallel to a lengthwise orientation of a vehicle in a wash bay;
a trolley, moveably coupled to the bridge, the trolley operable to reciprocate on the bridge along a second orientation, the second orientation substantially parallel to a widthwise orientation of the vehicle in the wash bay;
a motor mount that is attached to the trolley;
an arm rotation motor mounted on the motor mount;
a first member fixedly attached to the trolley;
a second member mounted to the first member utilizing one or more flexible mounting members;
an arm displacement member mounted on the first member that projects through an aperture in the second member; and
a trolley displacement member positioned on the second member substantially parallel to at least a portion of the boom arm displacement member to define a gap between the trolley displacement member and the at least a portion of the boom arm displacement member; and
a sensor positioned at least partially within the gap and comprising at least one proximity sensor operable to detect two-dimensional displacement between the motor mount and trolley by measuring a proximity of the boom arm displacement member to the trolley displacement member.

13. A system for handling boom arm impact in an automatic vehicle wash, comprising
a bridge that is operable to reciprocate along a first orientation, the first orientation substantially parallel to a lengthwise orientation of a vehicle in a wash bay;
a trolley, moveably coupled to the bridge, the trolley operable to reciprocate on the bridge along a second orientation, the second orientation substantially parallel to a widthwise orientation of the vehicle in the wash bay;
a motor mount that is pivotally attached to the trolley and to an arm rotation motor;
a sensor mounted on the trolley;
a boom arm that is rotatably attached to the motor mount such that the boom arm is rotatable with respect to the trolley; and
a control unit operable to
receive from the sensor during an automatic wash process one or both of a displacement between the trolley and the arm rotation motor or a displacement velocity between the trolley and the arm rotation motor;
determine whether a boom arm impact has occurred by comparing the displacement or the displacement velocity to a baseline;
relocate the boom arm if the boom arm impact is determined.

14. The system of claim 1, further comprising a biasing member positioned between the trolley and the motor mount that is configured to bias the motor mount to resist pivoting of the biasing member relative to the trolley.

15. A method using a control unit for handling boom arm impact in an automatic vehicle wash, the method comprising
moving a boom arm at least a portion of a way around the perimeter of a vehicle in a wash bay during an automatic wash process by at least one of moving a bridge along a first orientation substantially parallel to a lengthwise orientation of the vehicle, moving a trolley on the bridge along a second orientation substantially parallel to a widthwise orientation of the vehicle, or rotating the boom arm with respect to the trolley, wherein the boom arm is coupled to the trolley via a motor mount that is attached to the trolley and to an arm rotation motor;
receiving from at least one sensor at least one of an angular displacement between the trolley and the motor mount or a displacement velocity between the trolley and the motor mount during the automatic wash process;

determining whether a boom arm impact has occurred by comparing the at least one of the angular displacement and the displacement velocity to a baseline; and if it is determined that the boom arm impact has occurred, relocating the boom arm.

16. The method of claim 15, wherein the displacement is at least one of a two-dimensional displacement between the trolley and the motor mount or an angular displacement between the trolley and the motor mount.

17. The method of claim 16 further comprising continuing the automatic wash process after relocating the boom arm utilizing at least one spray mechanism other than the boom arm.

18. The method of claim 15, wherein if the boom arm is located in a quadrant of the wash bay associated with a front of the vehicle, the operation of relocating the boom arm further comprises moving at least one of the boom arm, the trolley, or the bridge to a position occupied at the start of the wash process.

19. The method of claim 15, wherein if the boom arm is located in a quadrant of the wash bay associated with a back of the vehicle the operation of relocating the boom arm further comprises moving the trolley on the bridge along the second orientation away from the boom arm impact; and moving the bridge along the first orientation away from the vehicle; and the method further comprises continuing the automatic wash process after relocating the boom arm.

20. The method of claim 15, wherein if the boom arm is located in a quadrant of the wash bay associated with either a driver side of the vehicle or a passenger side of the vehicle, the operation of relocating the boom arm comprises moving the bridge along the first orientation away from the boom arm impact; and moving the trolley on the bridge along the second orientation away from the vehicle; and the method further comprises continuing the automatic wash process after relocating the boom arm.

21. The method of claim 15, wherein the operation of relocating the boom arm further comprises prematurely ending the automatic wash process.

22. The method of claim 15, wherein the baseline comprises at least one of the following:

an expected displacement between the trolley and the motor mount and an expected displacement velocity between the trolley and the motor mount related to at least one of movement of the bridge during the automatic wash process;

movement of the trolley during the automatic wash process;

rotation of the boom arm during the automatic wash process; or thrust of one of more spray nozzles during the automatic wash process.

23. The method of claim 15 further comprising deriving the baseline by recording data received from the at least one sensor during a previously performed automatic wash process.

24. The method of claim 15, wherein the at least one control unit utilizes a different baseline based on which quadrant of the wash bay the boom arm is located within.

25. The method of claim 15, wherein the boom arm is attached to the motor mount via a breakaway mechanism that is operable to disengage the boom arm from the motor mount when the boom arm is involved in an impact of sufficient force; and disengagement of the boom arm from the motor mount causes a breakaway target assembly to displace with respect to a breakaway sensor that is mounted on the trolley; and the method further comprises halting movement of the boom arm in response to detection of the displacement of the breakaway target assembly by the breakaway sensor.

* * * * *